United States Patent
Yedur et al.

(10) Patent No.: US 6,479,817 B1
(45) Date of Patent: Nov. 12, 2002

(54) CANTILEVER ASSEMBLY AND SCANNING TIP THEREFOR WITH ASSOCIATED OPTICAL SENSOR

(75) Inventors: Sanjay K. Yedur, Santa Clara, CA (US); Bhanwar Singh, Morgan Hill, CA (US); Bryan K. Choo, Mountain View, CA (US); Carmen L. Morales, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/537,237

(22) Filed: Mar. 28, 2000

(51) Int. Cl.$^7$ .............................. G01N 23/00; G21K 7/00
(52) U.S. Cl. ..................... 250/306; 250/307; 250/309; 250/310
(58) Field of Search ................................. 250/306, 234, 250/307, 309, 310

(56) References Cited

U.S. PATENT DOCUMENTS

| | | | |
|---|---|---|---|
| 4,906,840 A | 3/1990 | Zdeblick et al. | |
| 5,045,936 A * | 9/1991 | Lobb et al. | 358/100 |
| 5,116,462 A | 5/1992 | Bartha et al. | |
| 5,274,230 A * | 12/1993 | Kajimura et al. | 250/234 |
| 5,324,935 A | 6/1994 | Yasutake | |
| 5,354,985 A | 10/1994 | Quate | |
| 5,410,151 A * | 4/1995 | Buckland | 250/227.26 |
| 5,489,774 A * | 2/1996 | Akamine et al. | 250/234 |
| 5,540,958 A | 7/1996 | Bothra et al. | |
| 5,548,113 A * | 8/1996 | Goldberg et al. | 250/234 |
| 5,650,614 A | 7/1997 | Yasutake et al. | |
| 5,675,145 A | 10/1997 | Toda et al. | |
| 5,770,856 A * | 6/1998 | Fillard et al. | 250/234 |
| 5,838,000 A * | 11/1998 | Mertesdorf et al. | 250/234 |
| 5,861,550 A | 1/1999 | Ray | |
| 5,861,624 A | 1/1999 | Alexander et al. | |
| 5,923,033 A * | 7/1999 | Takayama et al. | 250/234 |
| 5,952,657 A | 9/1999 | Alexander et al. | |
| 5,965,218 A | 10/1999 | Bothra et al. | |
| 5,982,009 A | 11/1999 | Hong et al. | |
| 5,994,691 A * | 11/1999 | Konada | 250/234 |
| 6,013,925 A | 1/2000 | Ogawa | |
| 6,057,546 A | 5/2000 | Braunstein et al. | |
| 6,239,426 B1 | 5/2001 | Muramatsu et al. | |
| 6,267,005 B1 | 7/2001 | Samsavar et al. | |
| 6,278,113 B1 * | 8/2001 | Murayama et al. | 250/306 |

* cited by examiner

Primary Examiner—Bruce Anderson
Assistant Examiner—David A. Vanore
(74) Attorney, Agent, or Firm—Eschweiler & Associates, LLC

(57) ABSTRACT

A measuring system and apparatus is provided in which a scanning probe microscope includes a high resolution optical sensor adapted to view a portion of a workpiece beneath the scanning probe tip. Also provided is a scanning tip assembly with a cantilever/tip assembly and an optical sensor associated with the cantilever assembly. In one embodiment, the optical sensor comprises a charge coupled device or other solid state camera associated with the cantilever and/or the tip. In addition, a scanning tip assembly is provided for a scanning probe microscope having an optical fiber adapted to receive reflected light from the at least a portion of the workpiece. Also provided is a measuring apparatus comprising a scanning probe microscope having an optical fiber adapted to receive reflected light from a feature of a workpiece, and an optical processor connected to the optical fiber to provided a visual image based on the reflected light from the feature of the workpiece.

32 Claims, 21 Drawing Sheets

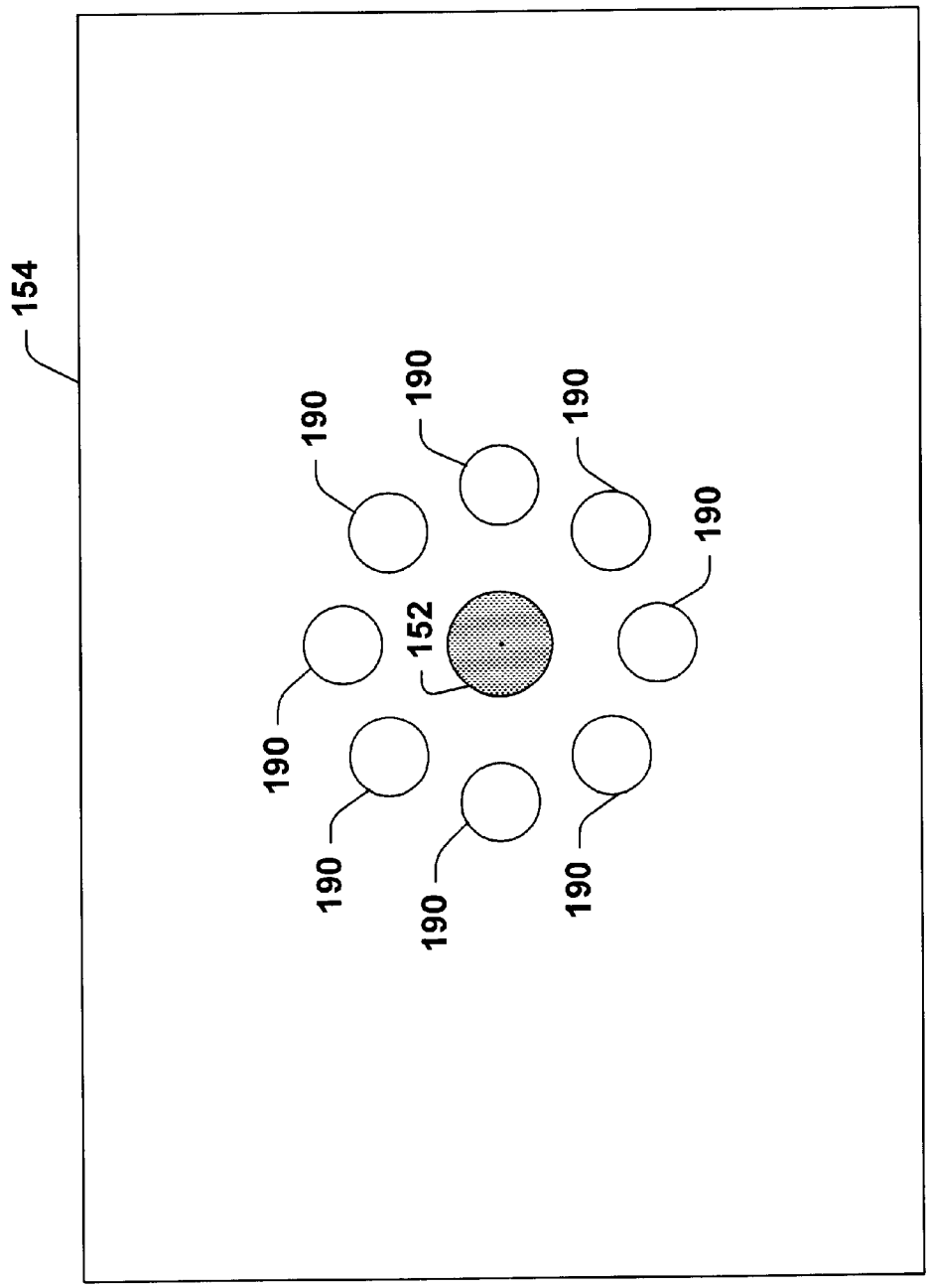

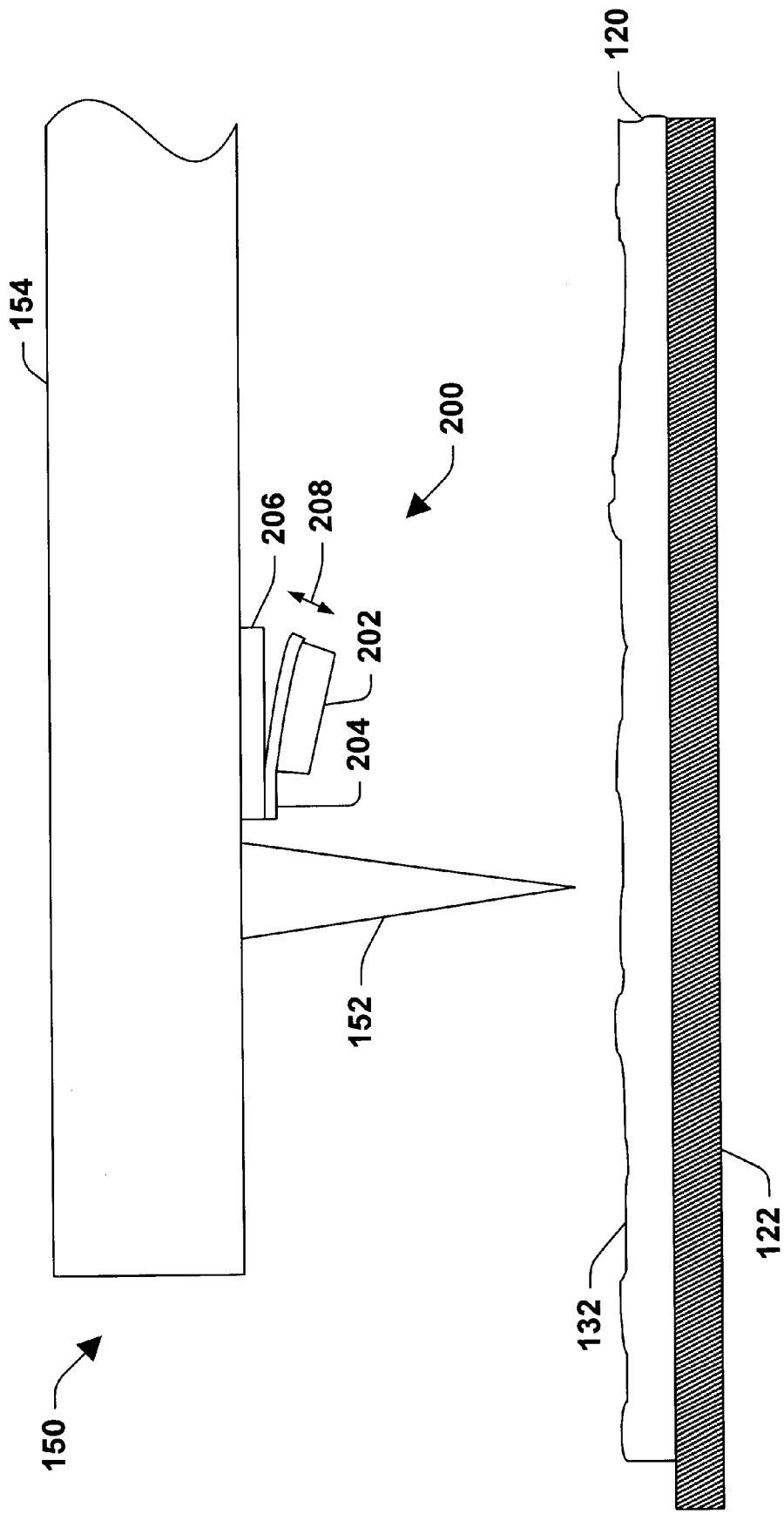

CANTILEVER ASSEMBLY AND SCANNING TIP THEREFOR WITH ASSOCIATED OPTICAL SENSOR

The present invention relates generally to measurement instruments and more particularly to a system and apparatus for scanning and imaging a surface of a semiconductor or other type of workpiece.

BACKGROUND OF THE INVENTION

In the semiconductor industry there is a continuing trend toward higher device densities. To achieve these high densities there have been, and continue to be, efforts toward scaling down the device dimensions on semiconductor wafers. In order to accomplish such a high device packing density, smaller features sizes are required. This may include the width and spacing of interconnecting lines and the surface geometry such as the corners and edges of various features.

The requirement of small features with close spacing between adjacent features requires high resolution photo lithographic processes as well as high resolution inspection instruments. In general, lithography refers to processes for pattern transfer between various media. It is a technique used for integrated circuit fabrication in which, for example, a silicon wafer is coated uniformly with a radiation-sensitive film (e.g., a photoresist), and an exposing source (such as ultraviolet light, x-rays, or an electron beam) illuminates selected areas of the film surface through an intervening master template (e.g., a mask or reticle) to generate a particular pattern. The exposed pattern on the photoresist film is then developed with a solvent called a developer which makes the exposed pattern either soluble or insoluble depending on the type of photoresist (i.e., positive or negative resist). The soluble portions of the resist are then removed, thus leaving a photoresist mask corresponding to the desired pattern on the silicon wafer for further processing.

The trend toward higher device densities in the manufacture of semiconductor devices also requires higher resolution scanning and inspection instruments for analyzing various features of semiconductor devices. A measuring apparatus is required to inspect semiconductor devices in association with manufacturing production line quality control applications as well as with product research and development. The ability to scan and/or view particular features of a semiconductor workpiece allows for adjustment of manufacturing processes and design modifications in order to produce better products, reduce defects, etc.

The features of interest in a semiconductor device may be topographic. Conventional instruments for measuring topographic features include Scanning Probe Microscopes. One form of a Scanning Probe Microscope is an Atomic Force Microscope (AFM), which is sometimes alternatively referred to as a Scanning Force Microscope (SFM). AFMs include a sensor with a spring-like cantilever rigidly mounted at one end and having a scanning tip at a free end. AFMs may operate in contacting and non-contacting modes. In the contacting mode, the tip of an AFM is placed in low force contact with a surface of a semiconductor wafer or other workpiece of interest. The workpiece is then displaced relative to the AFM in one or more directions in a plane (e.g., the tip contacts the workpiece in a Z axis while the workpiece is displaced in the X and/or Y directions), to effect a scanning of the workpiece surface. As surface contours or other topographic features are encountered by the tip during scanning, the cantilever deflects. The cantilever deflection is then measured, whereby the topography of the workpiece may be determined.

In non-contacting operation, the tip is held a short distance, typically 5 to 500 Angstroms, from the workpiece surface, and is deflected during scanning by various forces between the workpiece and the tip. Such forces may include magnetic, electrostatic, and van der Waals forces. In both the contacting and non-contacting modes, measurements of a workpiece topography or other characteristic features are obtained through measuring the deflection of the cantilever. Deflection of the cantilever may be measured using precisely aligned optical components coupled to deflection measurement circuitry, although other techniques are sometimes employed.

Another form of Scanning Probe Microscopes is a Scanning Tunneling Microscope (STM). Where a feature of interest is non-topographic, AFMs as well as STMs may be utilized used to measure the workpiece feature. Examples of non-topographic features include the detection of variations in conductivity of a semiconductor workpiece material. An AFM can be used to scan a workpiece in the non-contacting mode during which deflections in the cantilever are caused by variations in the workpiece conductivity or other property of interest. The deflections can be measured to provide a measurement of the feature. STMs include a conductive scanning tip which is held in close proximity (within approximately 5 Angstroms) to the workpiece. At this distance, the probability density function of electrons on the tip spatially overlap the probability density function of atoms on the workpiece. Consequently, a tunneling current flows between the workpiece surface and the tip if a suitable bias voltage is applied between the tip and the workpiece. The workpiece and tip are relatively displaced horizontally (in the X and/or Y directions) while the tip is held a constant vertical distance from the workpiece surface. The variations in the current can be measured to determine the changes in the workpiece surface.

In another mode of operation, an STM can be used to measure topography. The scanner moves the tip up and down while scanning in the X and/or Y directions and sensing the tunneling current. The STM attempts to maintain the distance between the tip and the surface constant (through moving the tip vertically in response to measured current fluctuations). The movements of the tip up and down can be correlated to the surface topography profile of a workpiece.

Other features of interest in a workpiece may be visual. For example, it may be desirable to scan only specific devices in a semiconductor wafer workpiece, such as transistors, conductors, and the like. While an AFM or STM scan of the entire wafer may yield the desired topographical or other feature information, this requires a great amount of time, where in some circumstances only a localized scan is needed. In addition, tip wear is increased in situations where entire wafers are scanned only to measure small features of interest. In these circumstances, a visual image of the wafer or other workpiece may be used to locate the feature or device of interest, and a local scan may then be performed using one or more of the above methods.

Some conventional measuring instruments include an optical microscope on top of the head assembly of an AFM. However, these microscopes do not have the high resolution necessary to identify and locate the tiny devices and other features of interest in today's high device density semiconductor products. In addition, a visual image of the portion of a workpiece being scanned is unavailable to such microscopes because the cantilever and/or tip assembly of AFMs and STMs partially or completely block the view of the surface near the tip. Prior measuring devices have included optical microscopes laterally offset from the scanning location of an AFM. While the view of the optical microscope may be unobstructed, the optical microscope does not view the portion of the surface under the AMF tip. Other attempts include an AFM head for attachment directly to an optical microscope. However, the optical microscope lens head and the AFM cannot be used simultaneously to view the same portion of the workpiece surface.

SUMMARY OF THE INVENTION

A measuring system and apparatus is provided which overcomes or minimizes the problems and shortcomings of the prior art. The present invention provides a measuring apparatus used to obtain high resolution visual images of a scanned workpiece surface while scanning the surface using atomic force microscopy, scanning tunneling microscopy, or other related scanning technologies. This allows high resolution viewing of the surface of a workpiece directly below and proximate an AFM scanning tip during scanning operation of the AFM. A user may thus locate specific areas or features of interest on a workpiece surface visually while the AFM is scanning without the need to offset the AFM or to change heads in a conventional optical microscope. In addition, the invention provides for higher resolution visual imaging than previously available. The present invention thus provides a single instrument which may be used for both surface scanning measurements, as well as visual imaging, alone or in combination.

In accordance with one aspect of the present invention a system and apparatus are provided for measuring features on a workpiece which advantageously associate an optical sensor with a scanning probe microscope scanning assembly which can view the portion of the workpiece surface directly below and/or near the scanning tip. The system may further comprise a computer, display, camera, stereo microscope, or other optical processor for analyzing or viewing an image of the workpiece surface based on signals from the optical sensor. In this regard, the optical sensor may comprise a charge coupled device (CCD) or other solid state camera and may be associated with the cantilever and/or the tip. The optical sensor may further be incorporated directly into and/or fabricated on the cantilever or the tip.

In accordance with another aspect of the invention, a scanning tip assembly is provided for scanning a workpiece in a scanning probe microscope which may comprise an AFM or STM. The scanning tip assembly comprises a base and a cantilever assembly, with an optical sensor associated with the cantilever assembly. The optical sensor is adapted to provide a signal representative of the visual image of at least a portion of a workpiece and may further be fabricated on or integrated within the tip or cantilever. The invention thus allows the image to be obtained while an AFM or STM is scanning the workpiece portion. The optical sensor signal may be provided to a computer, camera, or other optical processor adapted to generate and/or display a visual image of the workpiece surface. In accordance with another aspect of the invention, the optical sensor may comprise a charge coupled device or other solid state camera and may be associated with the cantilever and/or the tip. Another aspect of the invention provides for fabrication of the optical sensor on the cantilever and/or the tip.

In accordance with yet another aspect of the present invention, a scanning tip assembly is provided for a scanning probe microscope having an optical fiber adapted to receive reflected light from a portion of a workpiece. This feature allows an optical sensor, camera, computer, stereo microscope, or other optical processor to receive the reflected light from the optical fiber for creating and/or displaying a visual image of the workpiece based on the reflected light. The scanning tip may be employed in an AFM or other scanning probe microscope, thereby providing simultaneous viewing and scanning of a workpiece surface. Another aspect of the invention provides for multiple optical fibers, enabling three dimensional viewing of topographical features of a workpiece surface using, for example, a stereo microscope or other optical processor. Further, the optical fiber may be provided with a lens in order to widen the field of view of the workpiece surface.

In accordance with still another aspect of the present invention, a measuring apparatus is provided comprising a scanning probe microscope having an optical fiber adapted to receive reflected light from a feature of a workpiece, and a camera or other optical processor associated with the optical fiber and adapted to generate a signal representing a visual image based on the reflected light from the feature of the workpiece. In addition, multiple optical fibers may be employed and providing light to a stereo microscope or other optical processor for generation of three dimensional visual images of a workpiece surface.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 7a is a sectional plan view taken along line 7—7 of the scanning assembly in FIG. 6;

FIG. 7b is a sectional plan view of a variation of the scanning assembly in FIG. 7a;

FIG. 8 is an elevation view illustrating another embodiment of a scanning assembly in accordance with the invention;

DETAILED DESCRIPTION OF THE INVENTION

Figure 1:
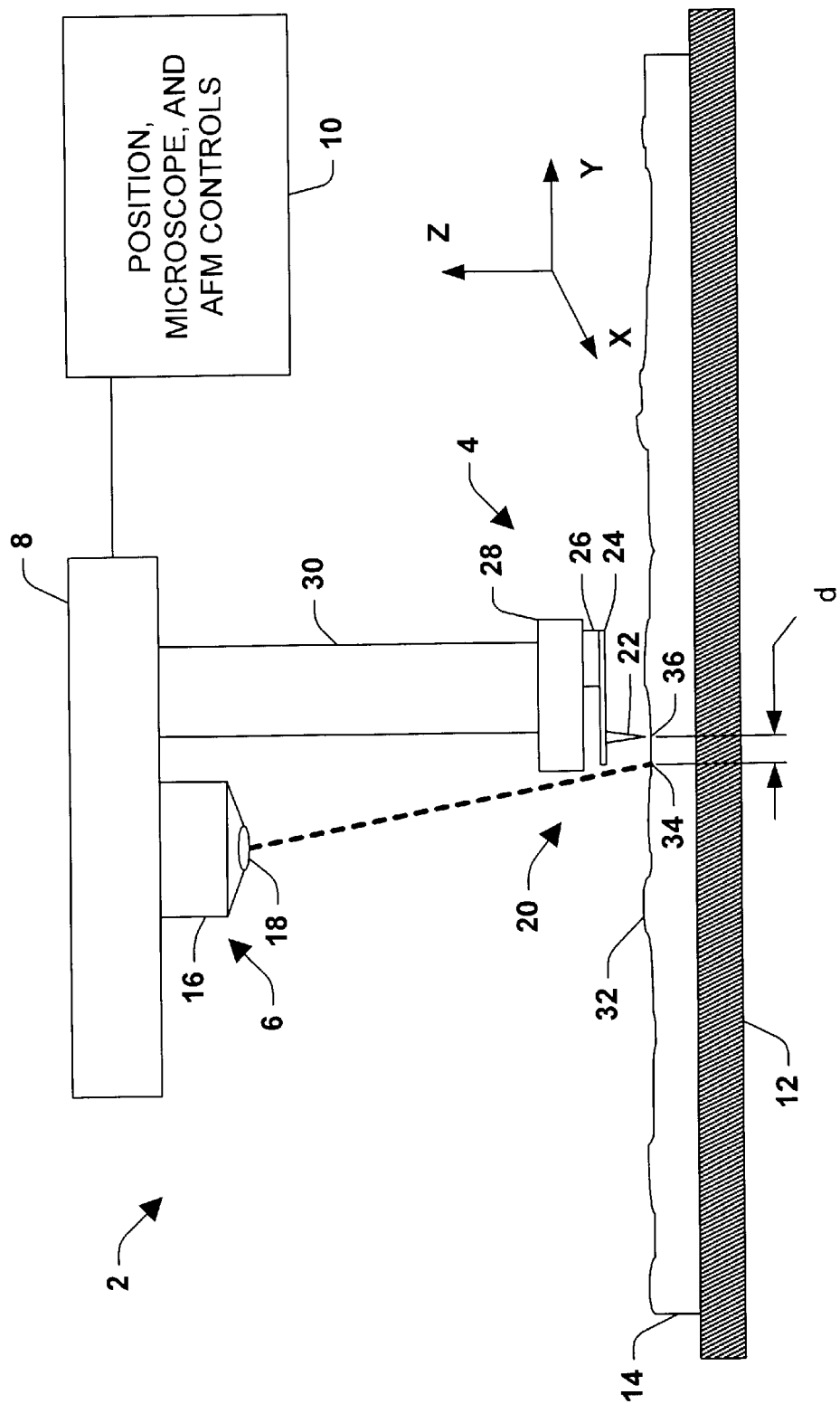
FIG. 1 is an elevation view of a conventional atomic force microscope and an optical microscope.

The following is a detailed description of the present invention made in conjunction with the attached Figures, wherein like reference numerals will refer to like elements throughout. The invention provides a scanning probe microscope with optical components capable of viewing the surface of a workpiece directly below or near the scanning tip. The optical components may include one or more optical sensors located proximate the scanning tip and/or the cantilever associated therewith, thus allowing a user to obtain high resolution images of the surface being scanned by the scanning probe microscope tip.

Referring now to the Figures, several aspects of the present invention are presented. In FIG. 1, a conventional measurement system 2 is illustrated having an atomic force microscope (AFM) 4 and an optical microscope 6 mounted on a head 8. The system includes controls 10 for the optical microscope 6 and the AFM 4, as well as for adjusting the position of a table 12 to scan a workpiece 14 mounted on the table 12 in the X and/or Y directions. The optical microscope 6 includes a housing 16 mounted on the head 8 and a lens 18. The AFM 4 includes a scanning assembly 20 having a scanning tip 22 mounted on the free end of a cantilever 24. The other end of the cantilever 24 is mounted to a base 26 which is in turn mounted to an AFM head 28. The AFM 4 is attached to the system head 8 using a vertical arm 30 which may include controls for vertically positioning the AFM 4 in the Z direction.

The optical microscope 6 is laterally offset from the vertical arm 30 and positioned so as to view a portion of a top surface 32 of the workpiece 14. The optical microscope 6, however, has a limited view of the workpiece surface, as the AFM scanning assembly 20 and/or the AFM head 28 block the microscope 6 from viewing the portion of the workpiece beneath the AFM 4. The closest point 34 viewable by the microscope 6 is laterally offset by a distance "d" from the point 36 on the workpiece 14 directly below the scanning tip 22 of the AFM 4. The conventional system thus cannot provide for visual imaging of the portion of the workpiece 14 beneath the AFM 4 during AFM scanning of the workpiece 14. As device feature sizes continue to decrease, the offset distance "d" becomes increasingly more significant and consequently inhibits a user from identifying accurately the location of the tip 22 on the surface 32.

Figure 2:
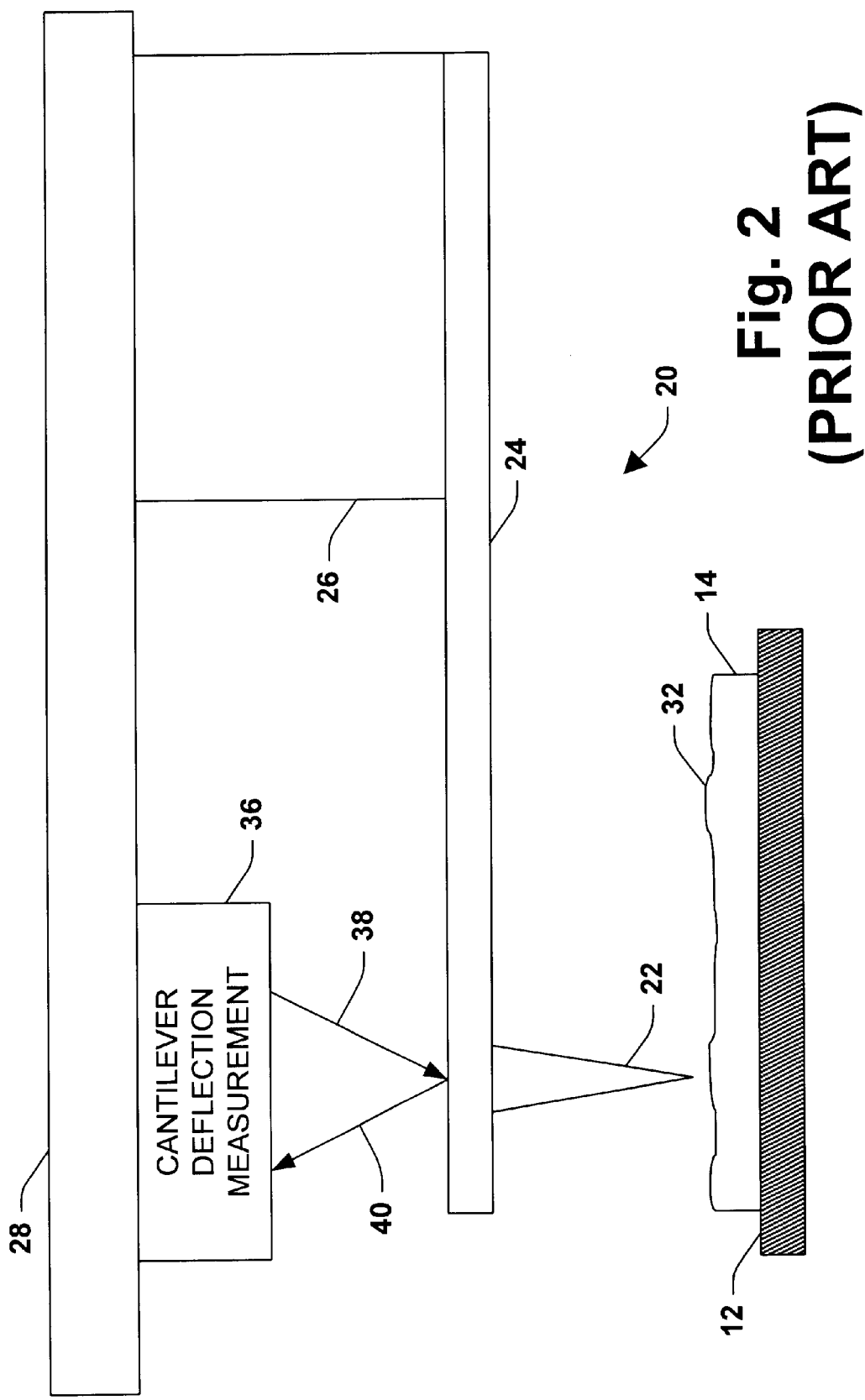
FIG. 2 is an elevation view of a conventional atomic force microscope.

FIG. 2 illustrates the conventional AFM scanning assembly 20 in greater details including the tip 22, cantilever 24, base 26 and the head 28 as described above in reference to FIG. 1. As the workpiece 14 is displaced in the X and/or Y directions relative to the scanning tip 22, the cantilever 24 deflects in the vertical Z direction, which deflection is detected by a deflection measurement device 36. Typically, this measurement is accomplished optically by directing light 38 toward the cantilever 24 and measuring the light 40 reflected therefrom. The deflection of the cantilever 24 can be used to measure features of the workpiece 14 including topographic as well as other characteristics of the workpiece, and the scanning assembly 20 may be used in either the contacting mode, wherein the tip 22 contacts the surface 32 of the workpiece 14, or the non-contacting mode, wherein the tip 22 is spaced from the surface 32. As seen in FIGS. 1 and 2, the scanning assembly 20 blocks the view of optical microscopes mounted above the assembly 20, thus preventing simultaneous scanning and visual imaging of the portion of the workpiece being scanned by an AFM.

Figure 3:
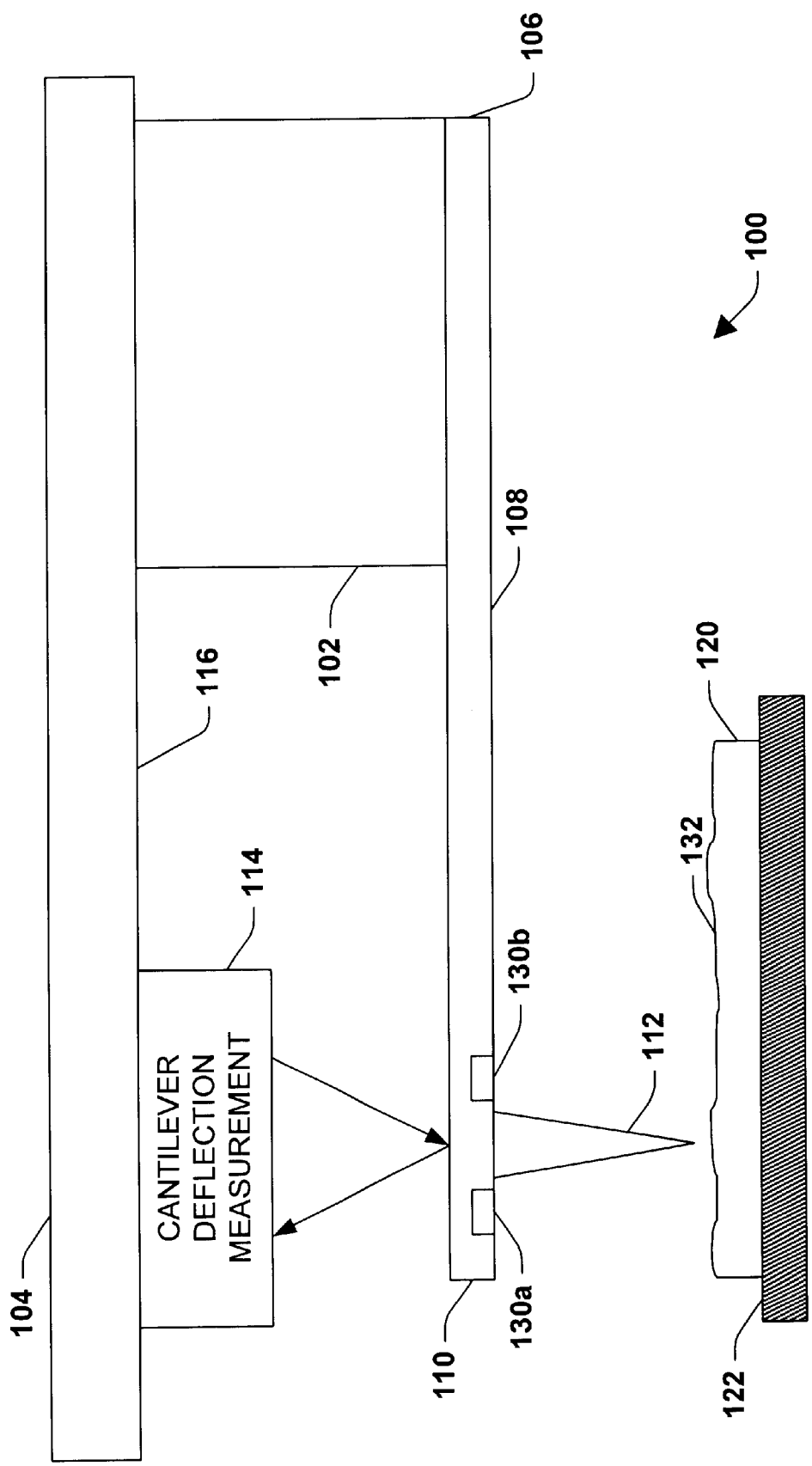
FIG. 3 is an elevation view illustrating one embodiment of a system and apparatus for measuring a feature of a workpiece in accordance with the present invention.

Referring now to FIG. 3, a scanning assembly 100 in accordance with the present invention is illustrated having a base 102 mounted between a head 104 and a fixed portion 106 of a cantilever 108. A free portion 110 of the cantilever 108 has a scanning tip 112 mounted on the lower surface thereof. The free portion 110 of the cantilever 108 is adapted to flex or deflect vertically in response to vertical forces on the tip 112. A measurement device 114 is mounted on the lower surface 116 of the head 104 to measure the vertical deflection of the free portion 110 of the cantilever 108 as the tip 112 scans a workpiece 120 on a table 122.

Optical sensors 130a and 130b are associated with the scanning assembly 100 and adapted to view a portion of the workpiece surface 132 below or near the scanning tip 112. In the embodiment of FIG. 3, the sensors 130a and 130b are positioned on the free portion 110 of the cantilever 108 near the tip 112 so as to view the portion of the workpiece surface 132 directly beneath and/or very near the scanning assembly 100. The optical sensors 130a and 130b may be connected to a camera, computer, display, stereo microscope, or other optical processor using electrical connections (not shown), to allow viewing of a visual image of the workpiece surface 132 during AFM scanning, which was heretofore not possible. Thus, an operator of a measurement system including the scanning assembly of FIG. 3, may identify or locate visually perceptible features of interest on the surface 132 of workpiece 120 and thereby correlate the scanning information related thereto obtained from the simultaneous atomic force microscopy. The provision of multiple optical sensors 130a and 130b further allows optical processing such as stereo microscopy, whereby a user may view three dimensional images of a workpiece surface 132. The scanning assembly of FIG. 3 can be employed in both the contacting and non-contacting modes of atomic force microscopy, as may be desired. Moreover, the close positioning of the sensors 130a and 130b to the workpiece surface 132 provides high resolution imaging capabilities required to discern features of interest in modern high device density semiconductor products.

Figure 4:
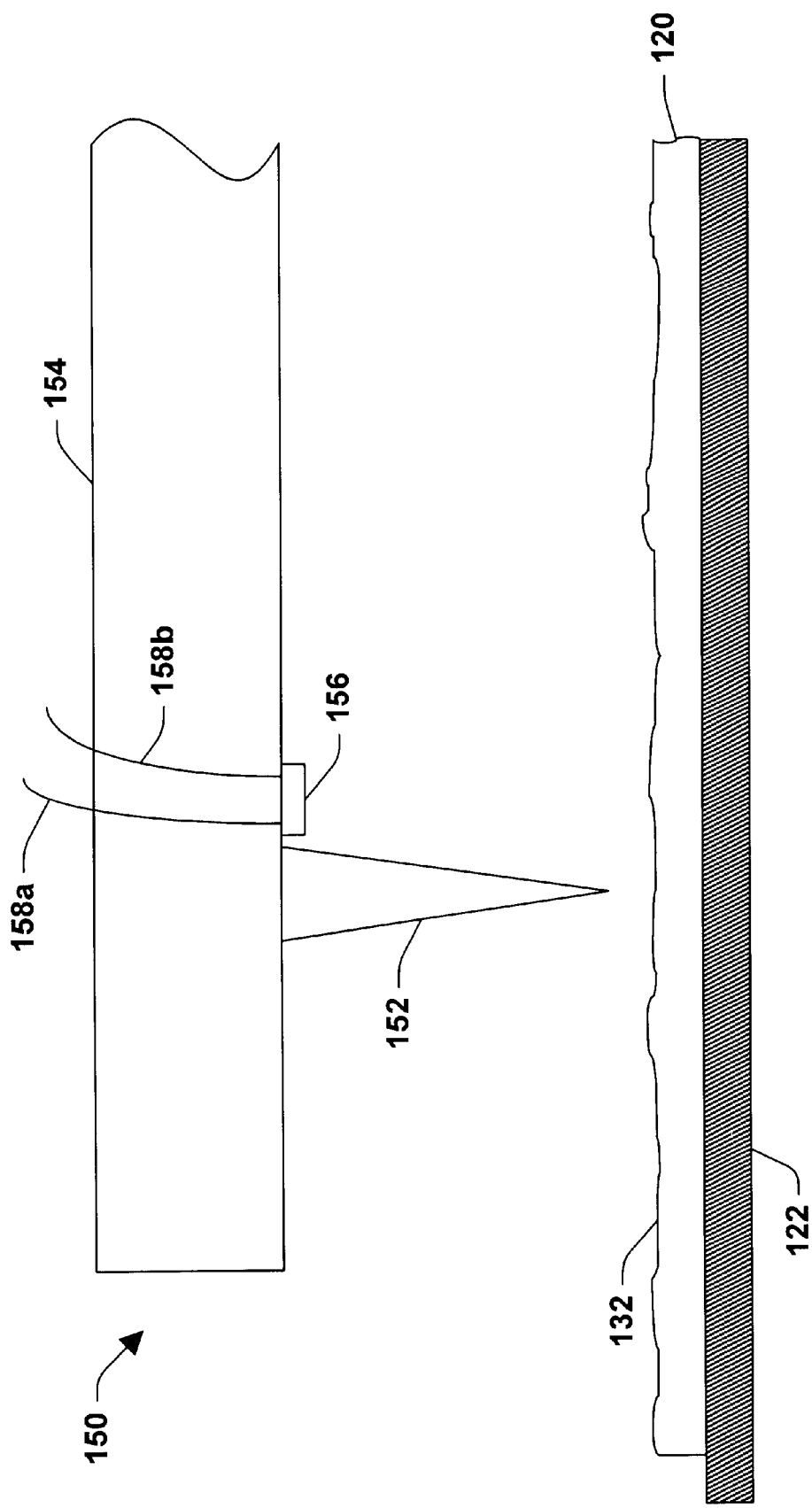
FIG. 4 is an elevation view illustrating one embodiment of a scanning assembly in accordance with the invention.

Referring now to FIG. 4, a portion of a cantilever assembly 150 is illustrated having a tip 152 mounted on a free portion of a cantilever 154 and an optical sensor 156 fabricated on the cantilever 154 near the tip 152. Thus positioned, the sensor 156 is adapted to view the portion of a scanned workpiece 120 directly beneath and/or very near the tip 152. The sensor 156 generates an output signal representative of the visual image of the workpiece surface 132 which may be connected to a computer, camera, display, or other optical processor via, for example, lead wires 158a and 158b to provide a visual image based on the output signal of sensor 156. The sensor 156 may be a solid state device such as, for example, a charge coupled device (CCD).

Figure 5:
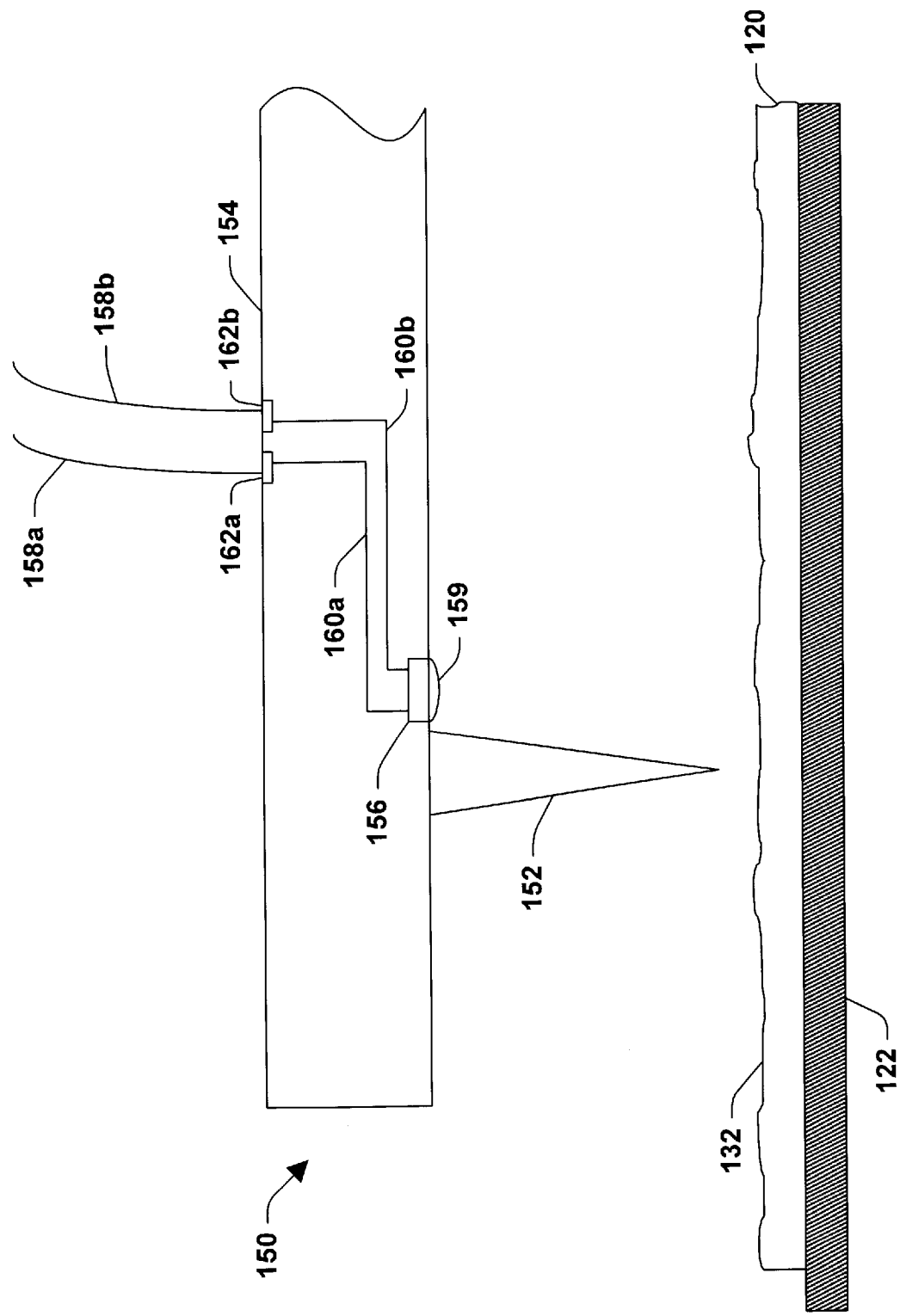
FIG. 5 is an elevation view illustrating another embodiment of a scanning assembly in accordance with the invention.

Referring also to FIG. 5, the optical sensor 156 may be integral with, or fabricated on or in, the cantilever 154. In this regard, the cantilever 154 and the sensor 156 may be fashioned from a semiconductor material in a unitary fashion where, for example, the sensor 156 is a CCD, within the scope of the invention. In addition, the scanning tip 152 may also be formed of a semiconductor material. Thus, the invention contemplates unitary embodiments of a cantilever assembly including a tip 152, cantilever 154, and optical sensor 156. The optical sensor 156 may further be provided with a lens 159, and electrical connection therewith may be provided by conductor lines 160a and 160b terminating at connectors 162a and 162b, respectively.

The lines 160a and 160b may be integrated on or within the cantilever 154 using semiconductor manufacturing techniques, and connection thereof to the sensor 156 may be likewise provided where the sensor 156 is fashioned from semiconductor materials. In this regard, the invention advantageously contemplates cost effective manufacture of cantilever assemblies which are easily employed within workpiece measuring apparatus and systems. Lead wires 158a and 158b may be attached by soldering or other electrical connection methods to the connectors 162a and 162b to provide the output signal (not shown) from the sensor 156 to a camera, display, optical processor, or other device (not shown) for viewing by an operator of a measuring system using the inventive scanning tip assembly.

Figure 6:
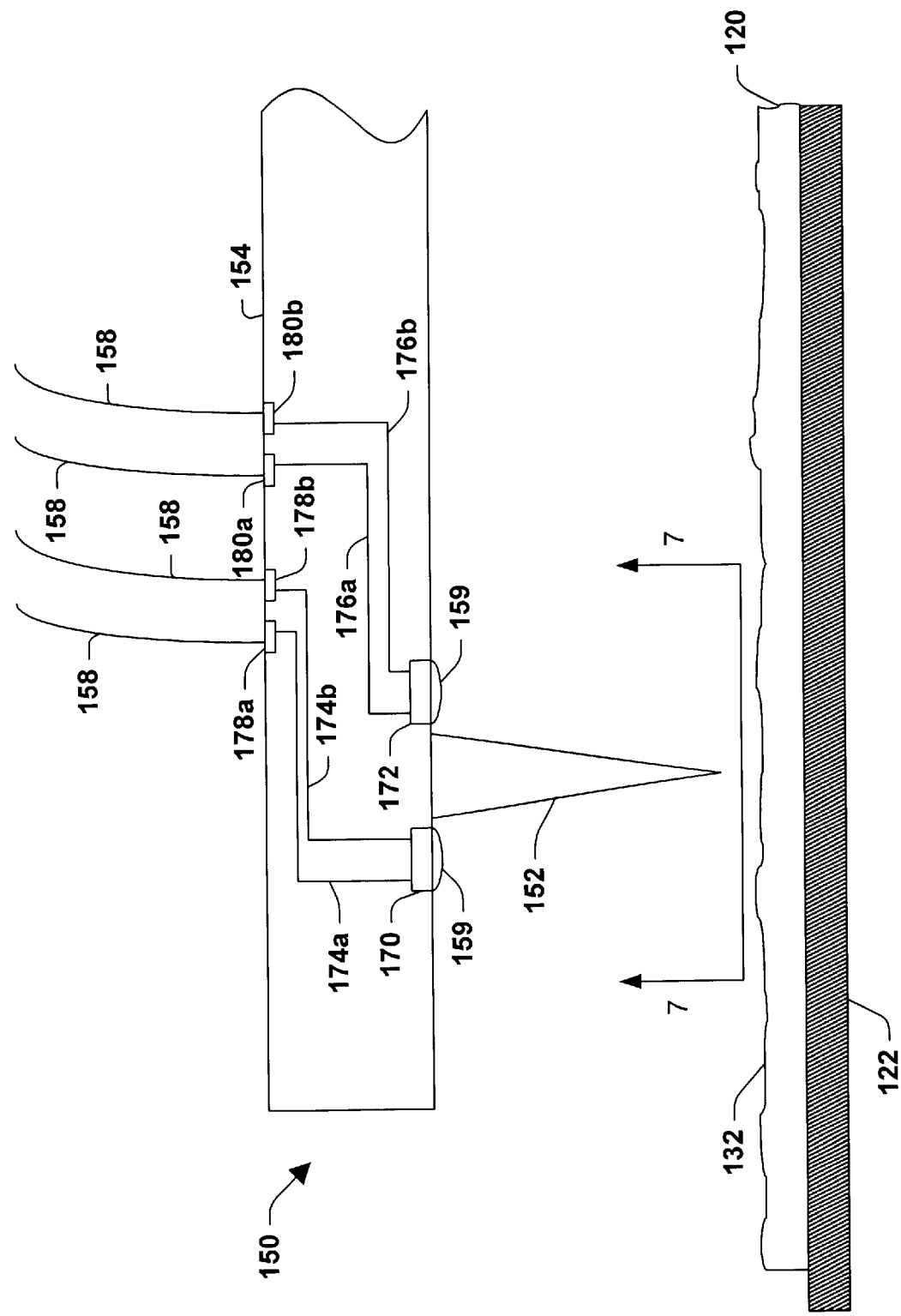
FIG. 6 is an elevation view illustrating another embodiment of a scanning assembly in accordance with the invention.
Figure 6A:
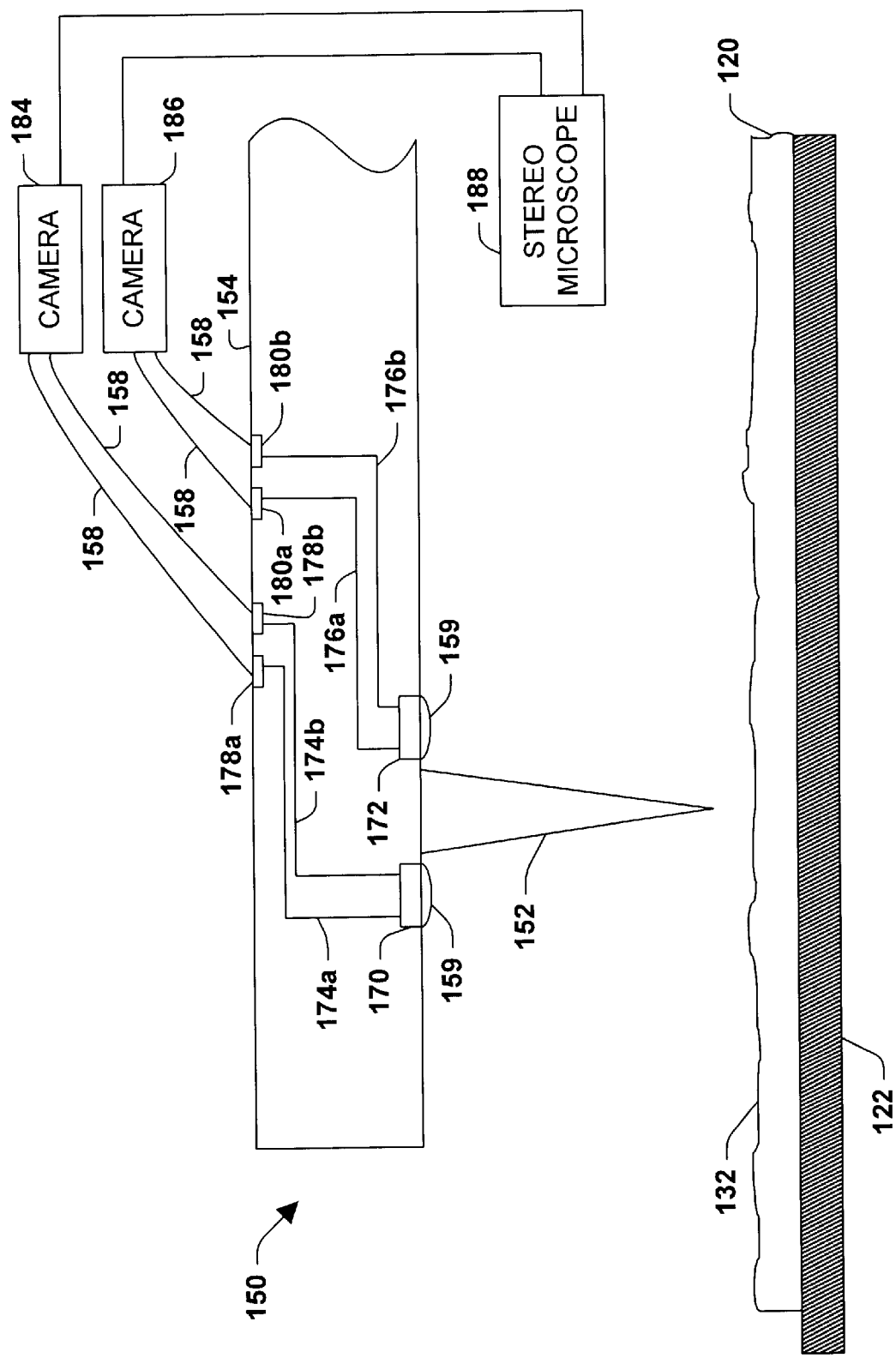
FIG. 6a is an elevation view illustrating another embodiment of a scanning assembly in accordance with the invention.

Another aspect of the invention is illustrated in FIG. 6, wherein multiple optical sensors 170 and 172 are provided in or on the cantilever assembly 150 located near the scanning tip 152. The sensors 170 and 172 are provided with conductor lines 174a, 174b, and 176a, 176b, for connection of the output signals therefrom (not shown) with connectors 178a, 178b, and 180a, 180b, respectively, and lead wires 158. In addition, the optical sensors 170 and 172 may be connected to cameras 184 and 186, respectively, which are connected to a stereo microscope 188, as illustrated in FIG. 6a. The stereo microscope 188, or other optical processor (not shown) may be used to reconstruct three dimensional images of the topography of the workpiece surface 132 from the optical signals provided by the sensors 159. A user may thus visually perceive depth features of the surface 132. It will be appreciated that other forms of optical processing may be provided for reconstructing optical data obtained via a plurality of optical sensors relating to the surface 132 in order to generate three dimensional images, which are deemed to fall within the scope of the present invention.

Referring also to FIG. 7a, a plurality of sensors, designated collectively as 190, may be provided on the lower side of the cantilever 154 in a circular pattern around the scanning tip 152. Each such sensor 190 optionally may be provided with a lens (not shown). Electrical connections (not shown) are provided for connecting the output signals of the sensors 190 with appropriate devices (not shown) such as a camera, computer, display, etc. The placement of multiple optical sensors on a cantilever 154 may comprise many different patterns within the scope of the present invention.

Figure 7B:
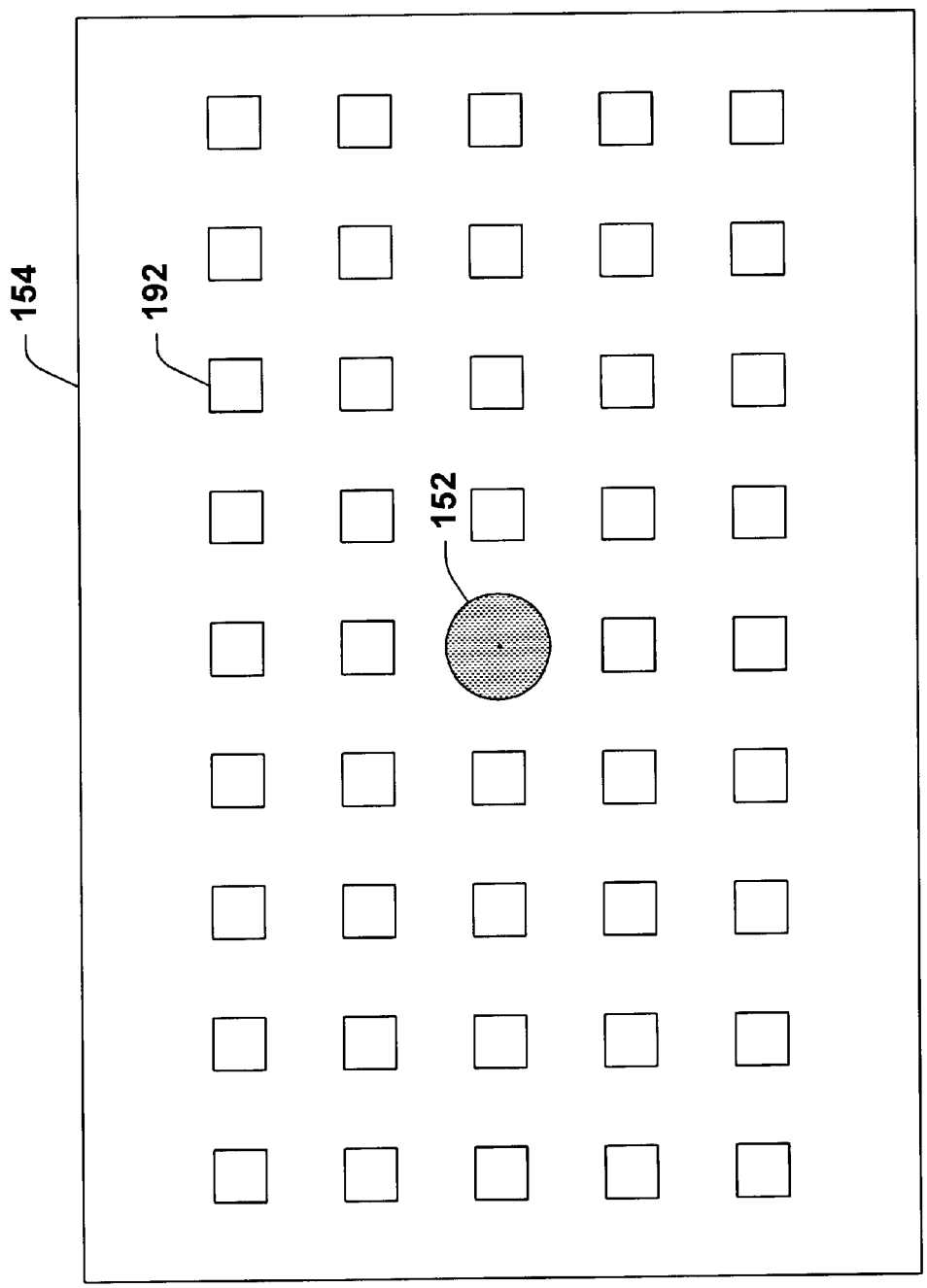

Another example is illustrated in FIG. 7b, wherein optical sensors 192 are arranged in an array pattern on the bottom of the cantilever 154 around the tip 152. Each such sensor 192 is provided with appropriate electrical connections (not shown) for connection with other measurement system components. Further, the sensors 156, 170, 172, 192, etc., may be CCDs, and may also be integrated into the cantilever during manufacturing, for cost or reliability reasons. As illustrated in FIGS. 7a and 7b, the invention thus provides for multiple sensors arranged so as to provide high resolution imaging of a workpiece surface being scanned by tip 152, thereby providing the advantages discussed supra.

In FIG. 8, another aspect of the invention is illustrated, wherein the cantilever assembly 150 includes an optical sensor assembly 200 associated with the cantilever 154 near the scanning tip 152. In this embodiment, the assembly 200 comprises an optical sensor 202, for example, a CCD, fabricated on a cantilever arm 204 and adapted to pivot with respect to a base 206 in the direction shown of arrow 208. Lead wires (not shown) are provided for connection of the output signal from the sensor 202, as well as for control of the pivoting cantilever arm 204, which may be a piezoelectric material. A plurality of similarly configured sensor assemblies 200 may be provided on the cantilever 154 within the present invention, arranged in various patterns.

The pivoting sensor assembly 200 may be advantageously employed so as to provide optical scanning of a wide area of the workpiece surface 132 being scanned. Further in this regard, the optical sensor assembly 200 may be located remote from the tip 152 if necessary, with the viewing of the workpiece surface 132 beneath the tip 152 being accomplished through the changing angle of the optical sensor 202 as the cantilever arm 204 is pivoted. While the embodiment illustrated in FIG. 8 comprises a piezoelectric material, other variations are possible within the scope of the present invention, including mechanical, electro-mechanical and/or micro electro-mechanical means, and the like.

Figure 9:
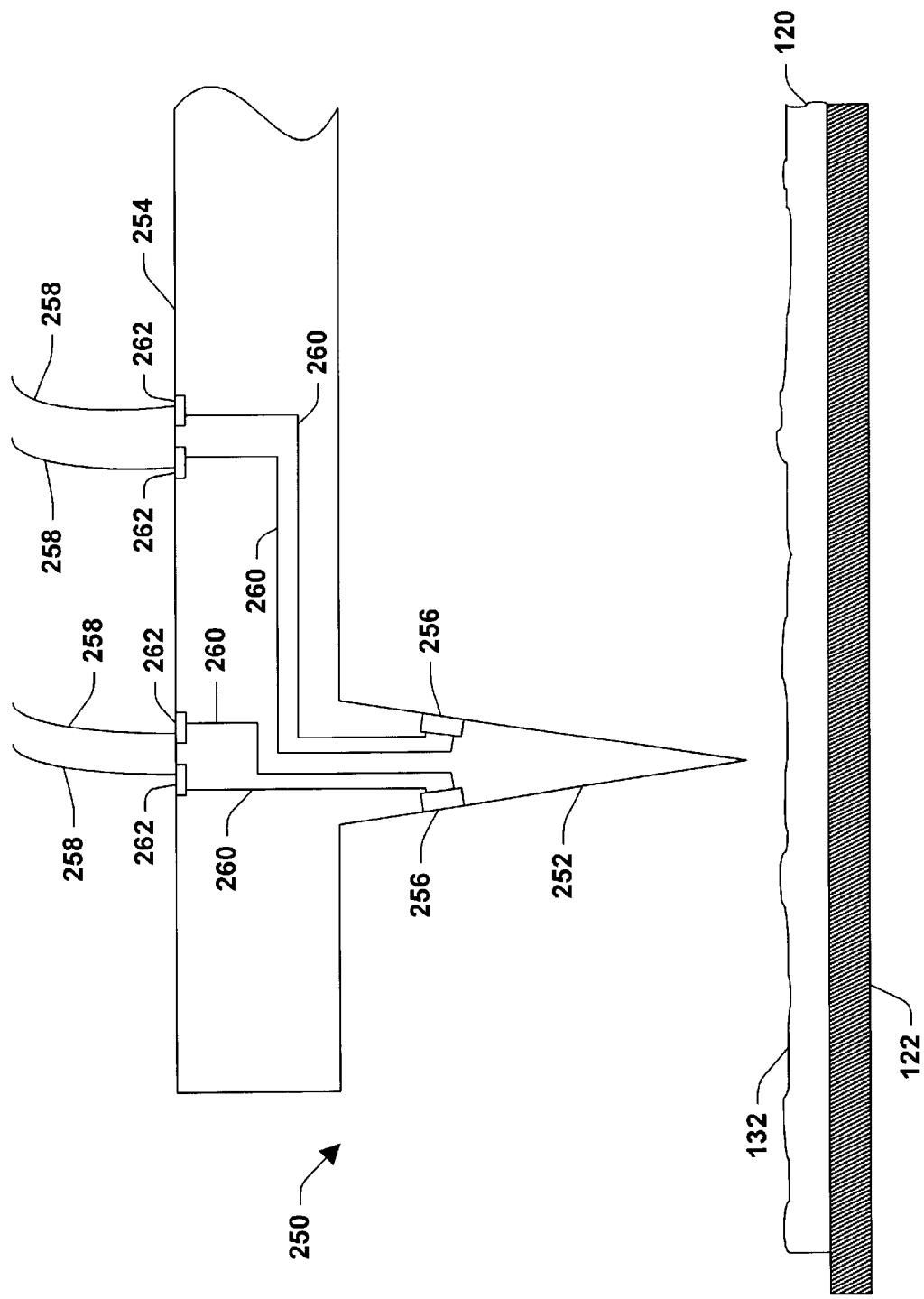
FIG. 9 is an elevation view illustrating another embodiment of a scanning assembly in accordance with the invention.

Referring now to FIG. 9, another embodiment of the invention is illustrated in which a scanning assembly 250 is provided with a cantilever 254 and a tip 252 so as to provide for AFM or STM scanning of a workpiece surface 132. The assembly 250 further comprises one or more optical sensors 256 on the tip 252, along with associated conductor lines 260 and connectors 262 for connection to other system devices using lead wires 258. The sensors 256 may be fabricated on the tip 252, or be integrated therewith. Similarly, the electrical connections therefor may be integrated in the tip 252 and/or the cantilever 254 within the invention. The sensors 256 may also include pivoting components (not shown), such as those illustrated in FIG. 8, and/or lenses (not shown), providing for wide angle viewing of the surface 132 of the workpiece 120.

Figure 10:
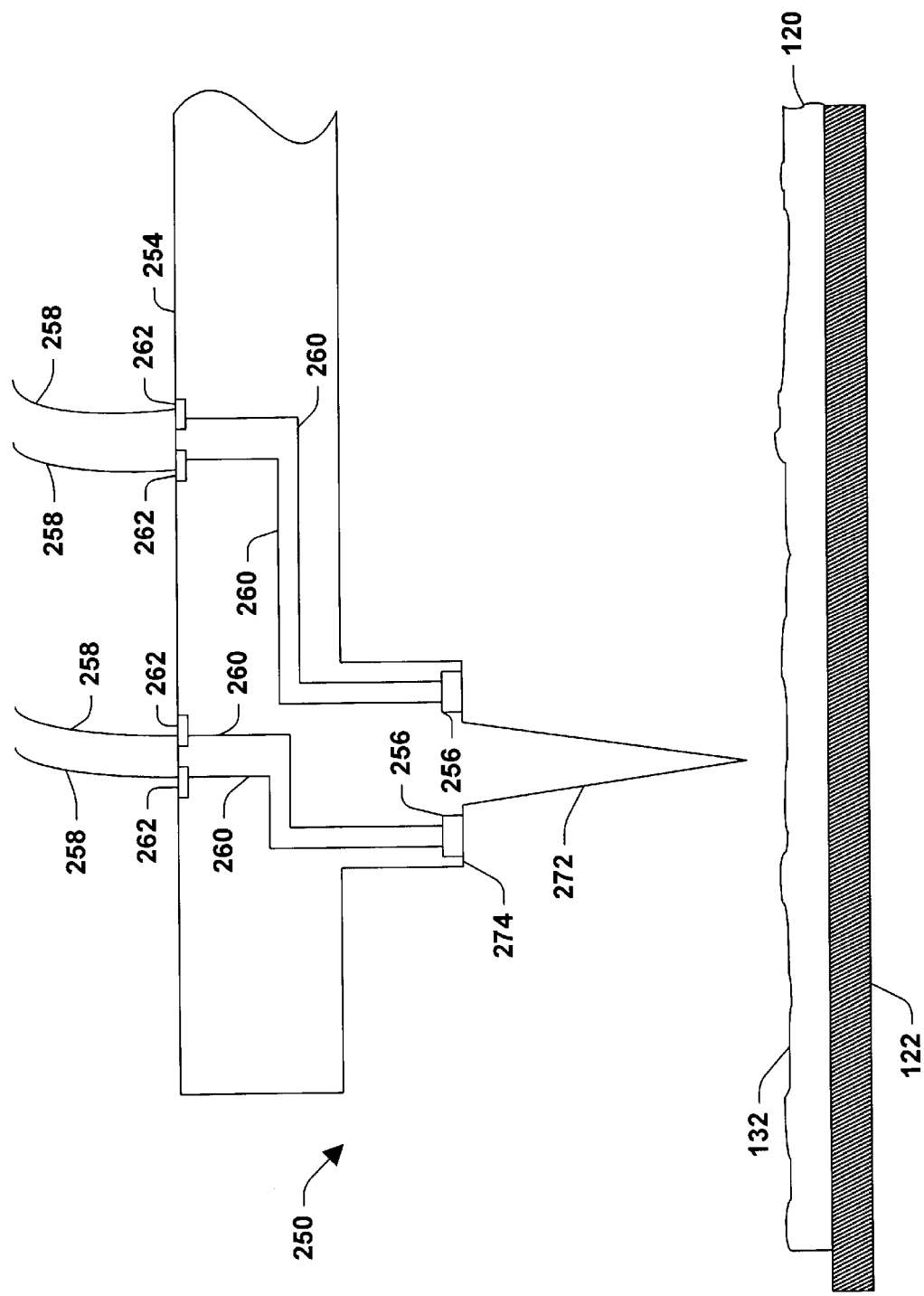
FIG. 10 is an elevation view illustrating another embodiment of a scanning assembly in accordance with the invention.

Referring also to FIG. 10, the scanning assembly may alternatively comprise a tip 272 having a ledge 274 generally parallel with the upper surface 132 of the workpiece 120. Optical sensors 256 may be fabricated on or in the tip ledge 274 to provide signals (not shown) representative of the visual image of the workpiece surface 132.

As with the embodiment of FIG. 9, the sensors 256 in FIG. 10 may be provided with conductor lines 260 and connectors 262 for connection to other system devices using lead wires 258. The sensors 256 employed on the tips 252, 272, may further comprises CCDs and may optionally have lenses (not shown) associated therewith. The tip ledge 274 is illustrated in FIG. 10 as being vertically located closer to the cantilever 254 than to the lower end of the tip 272. However, the ledge 274 may be closer to the end of the tip 272 in accordance with the invention. In addition, optical sensors 256 may be positioned on the tips 252, 272 in a variety of configurations or patterns, and such alternatives are contemplated as falling within the scope of the present invention. Also, one or more of the tip 272, cantilever 254, sensors 256, conductor lines 260, and/or connectors 262 may be integrated via semiconductor manufacturing techniques, including the possibility of a single piece scanning assembly (excluding the lead wires 258). Thus, a low cost scanning assembly may be provided in accordance with the invention, which allows high resolution visual imaging and scanning of a workpiece surface 132.

Figure 11:
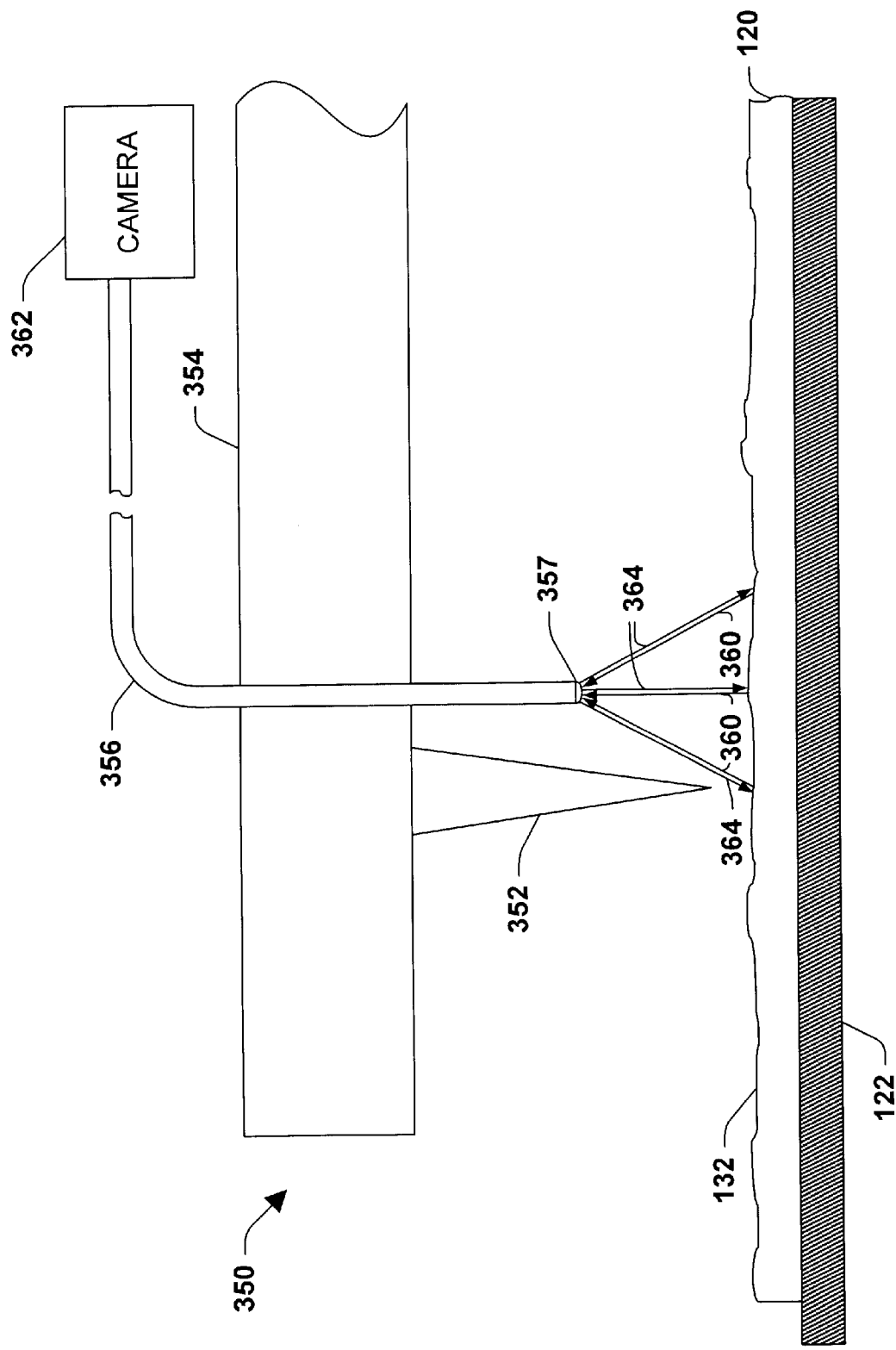
FIG. 11 is an elevation view illustrating another embodiment of a scanning assembly in accordance with the invention.
Figure 11A:
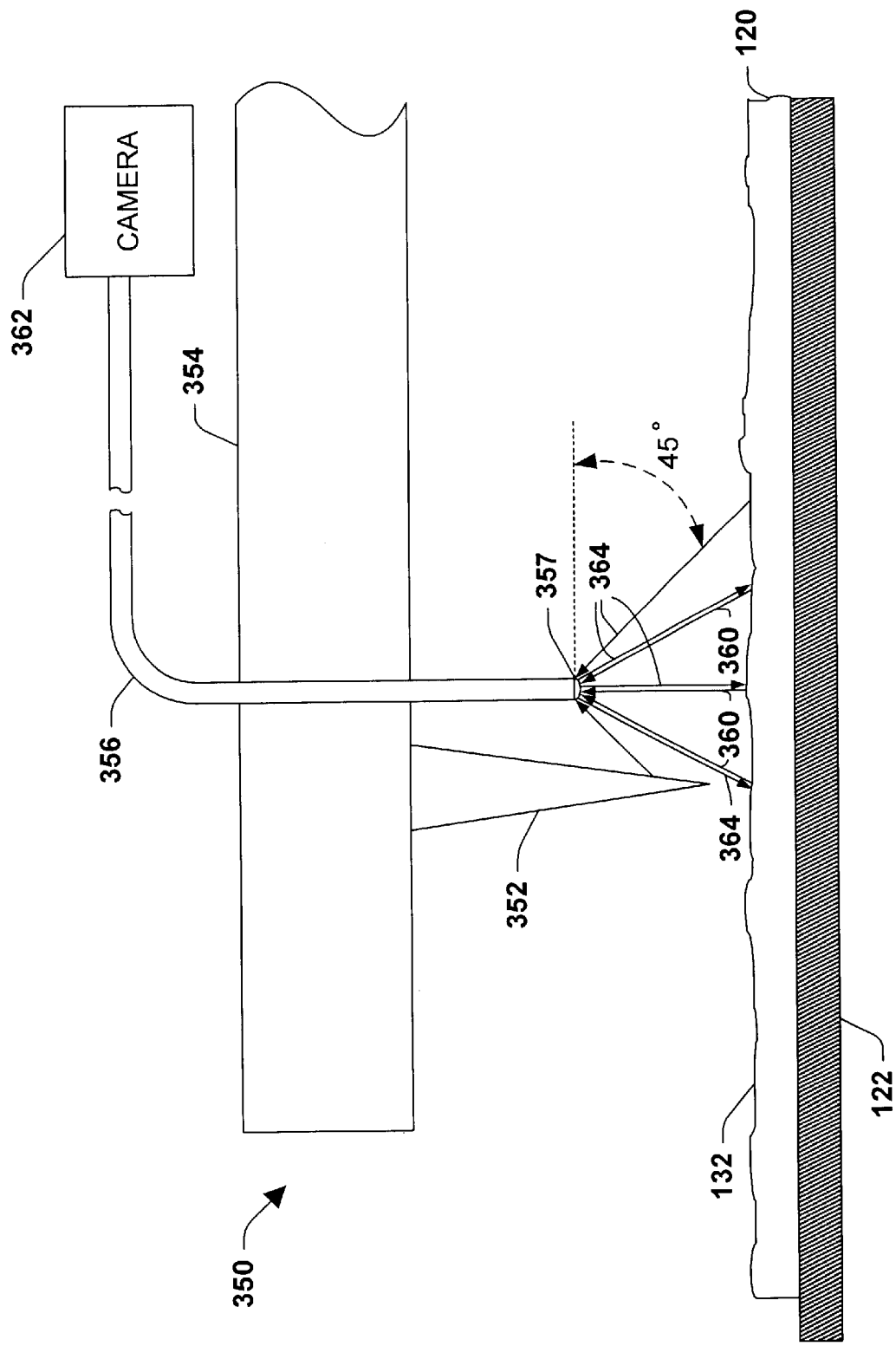
FIG. 11a is an elevation view illustrating another embodiment of a scanning assembly in accordance with the invention.

FIG. 11 illustrates another aspect of the present invention in which a scanning assembly 350 comprises a scanning tip 352 mounted on a cantilever 354, together with an optical fiber 356 adapted to receive reflected light 360 from a portion of the surface 132 of a workpiece 120 below and/or near the tip 352. The optical fiber 356 has a lens 357, and is associated with the scanning assembly 350 for obtaining light reflected from the workpiece surface 132 directly below and/or near the scanning tip 352. Referring also to FIG. 11a, the lens 357 may have a semispherical shape, or other shape as appropriate for obtaining wide angle viewing of the workpiece surface 132. The fiber 356 may be connected to a camera 362 or other optical processor or imaging device (not shown) which receives the light 360 reflected from the workpiece surface 132. The camera 362 then generates a signal (not shown) representative of a visual image based on the reflected light 360, which may then be viewed by a user using a computer, or display, or other device adapted to generate a visual image based on the camera signal.

The camera 362 may include a light source (not shown) providing light 364 through the optical fiber 356 which is then reflected off the workpiece surface 132 for transmission back through the fiber 356 to the camera 362 for display or other purposes. The lens 357 provides light 364 to, and receives reflected light 360 from a viewing field wider than the optical fiber 356, as illustrated in FIG. 11. This allows an optical fiber 356 to be utilized for viewing the portion of the workpiece surface 132 directly beneath the tip 352, where the fiber 356 is laterally offset from the tip 352. In this regard, the lens may provide for viewing angles of 45 degrees or wider, as illustrated in FIG. 11a. The invention contemplates optical fibers 356 which are very near to the tip 352, allowing viewing of the workpiece surface 132 beneath the tip. In this regard, the fiber 356 may be located on the tip 352 itself and/or be laterally offset therefrom. Reflected light can thereby be obtained from the portion of the surface 132 being scanned by the tip 352.

Figure 12:
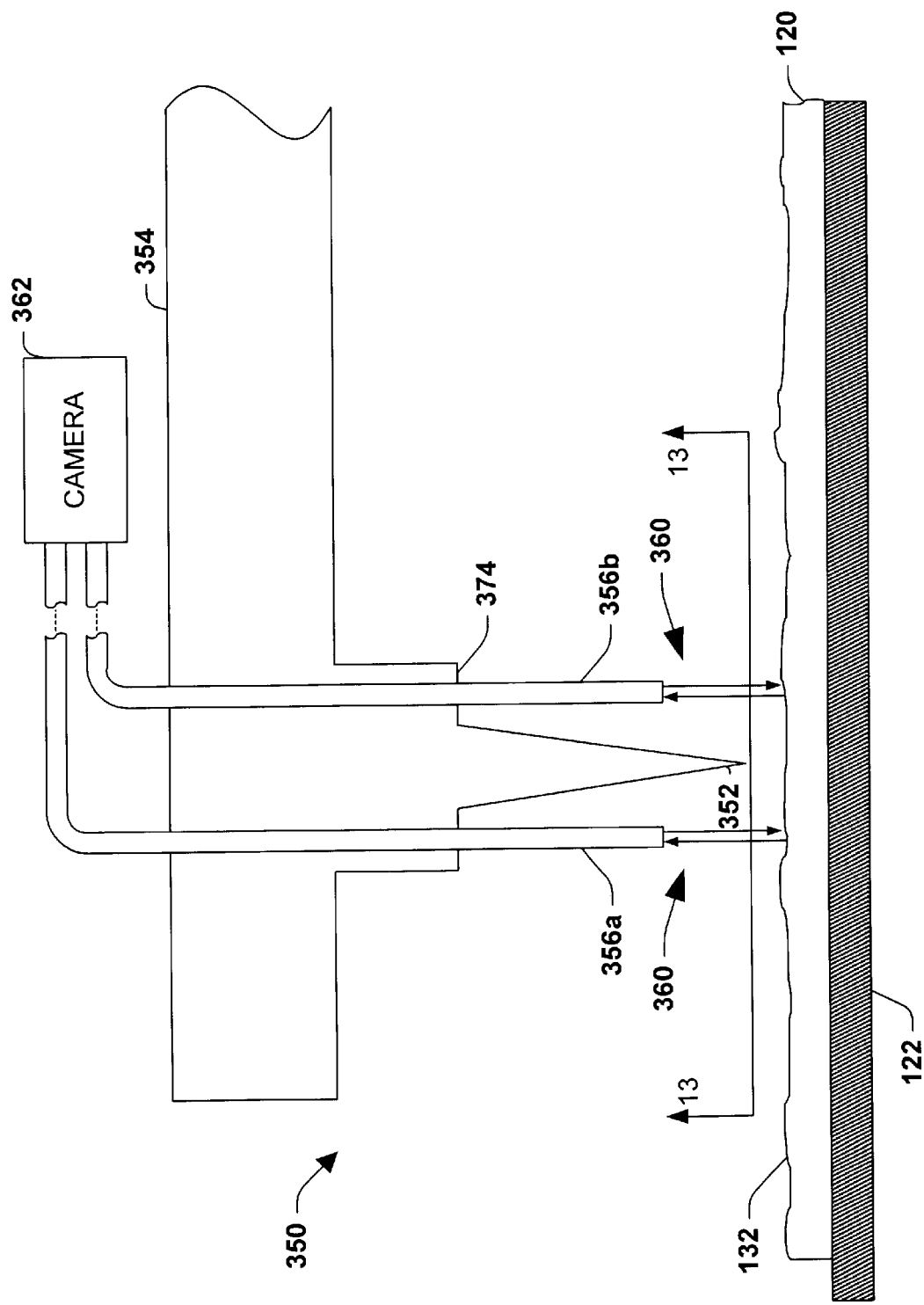
FIG. 12 is an elevation view illustrating another embodiment of a scanning assembly in accordance with the invention.
Figure 13:
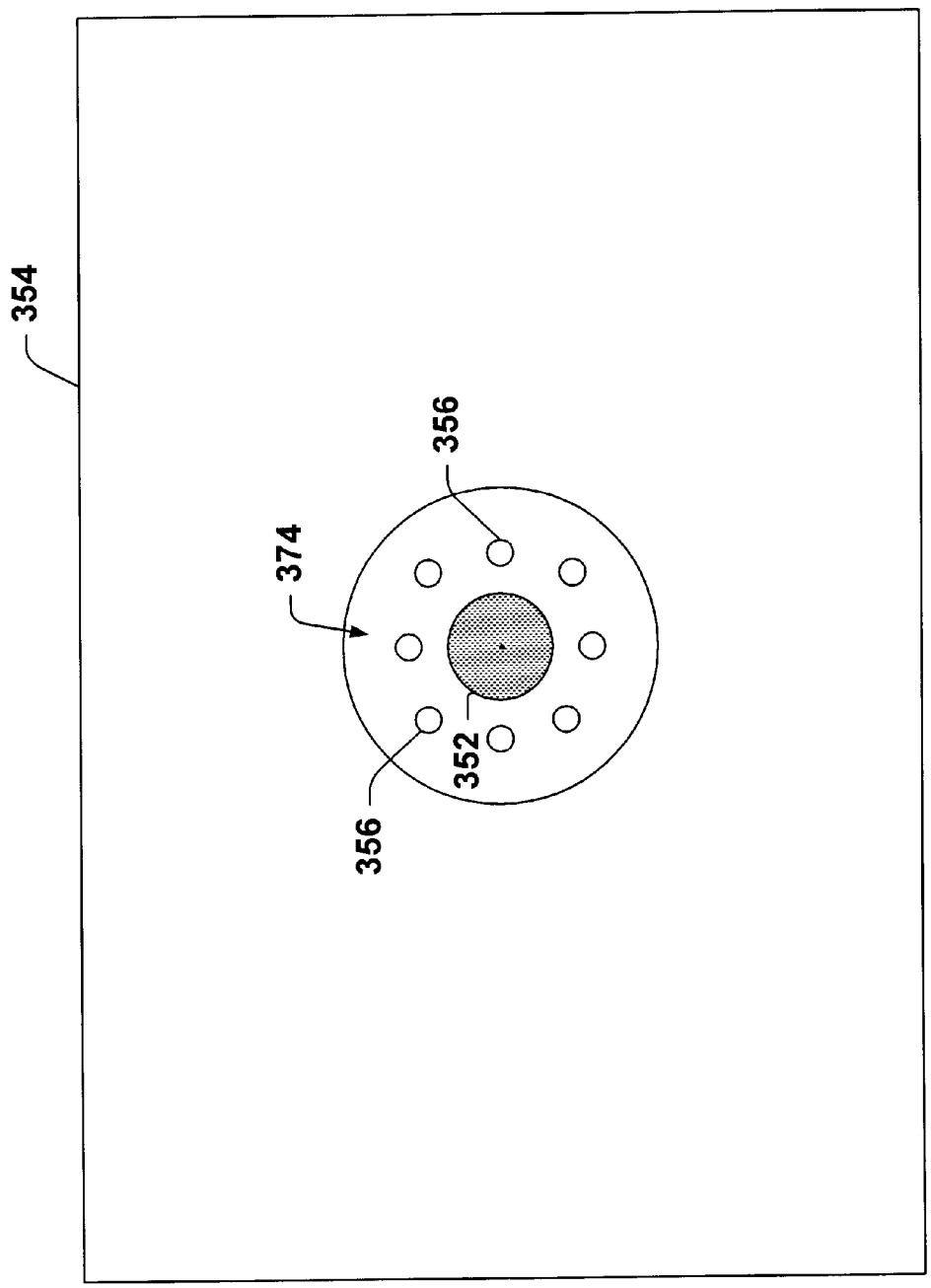
FIG. 13 is a plan view in section, taken along line 13—13 in FIG. 12, illustrating a scanning assembly in accordance with the invention.

As illustrated in FIG. 12, the assembly 350 may include a plurality of optical fibers 356a and 356b, for receiving and/or providing light 360 from and/or to the workpiece surface 132, for imaging by the camera 362. The fibers 356a, 356b may further be mounted on (or pass through) the sidewalls or a ledge 374 in the tip 352. As with the arrangement of multiple optical sensors on and around the scanning tip described above, the provision of multiple optical fibers 356 allows high resolution visual imaging of the workpiece surface 132, and the fibers 356 advantageously may be configured in a variety of patterns with respect to the tip 352, one of which is illustrated in FIG. 13. The fibers 356 may be configured to receive and/or provide light from and to the workpiece surface 132, and some fibers 356 may provide light while others exclusive receive light. Many various implementations are possible and are contemplated as falling within the scope of the present invention. Moreover, the optical fibers 356 may be configured at various angles, by bending or other measures (not shown).

Figure 12A:
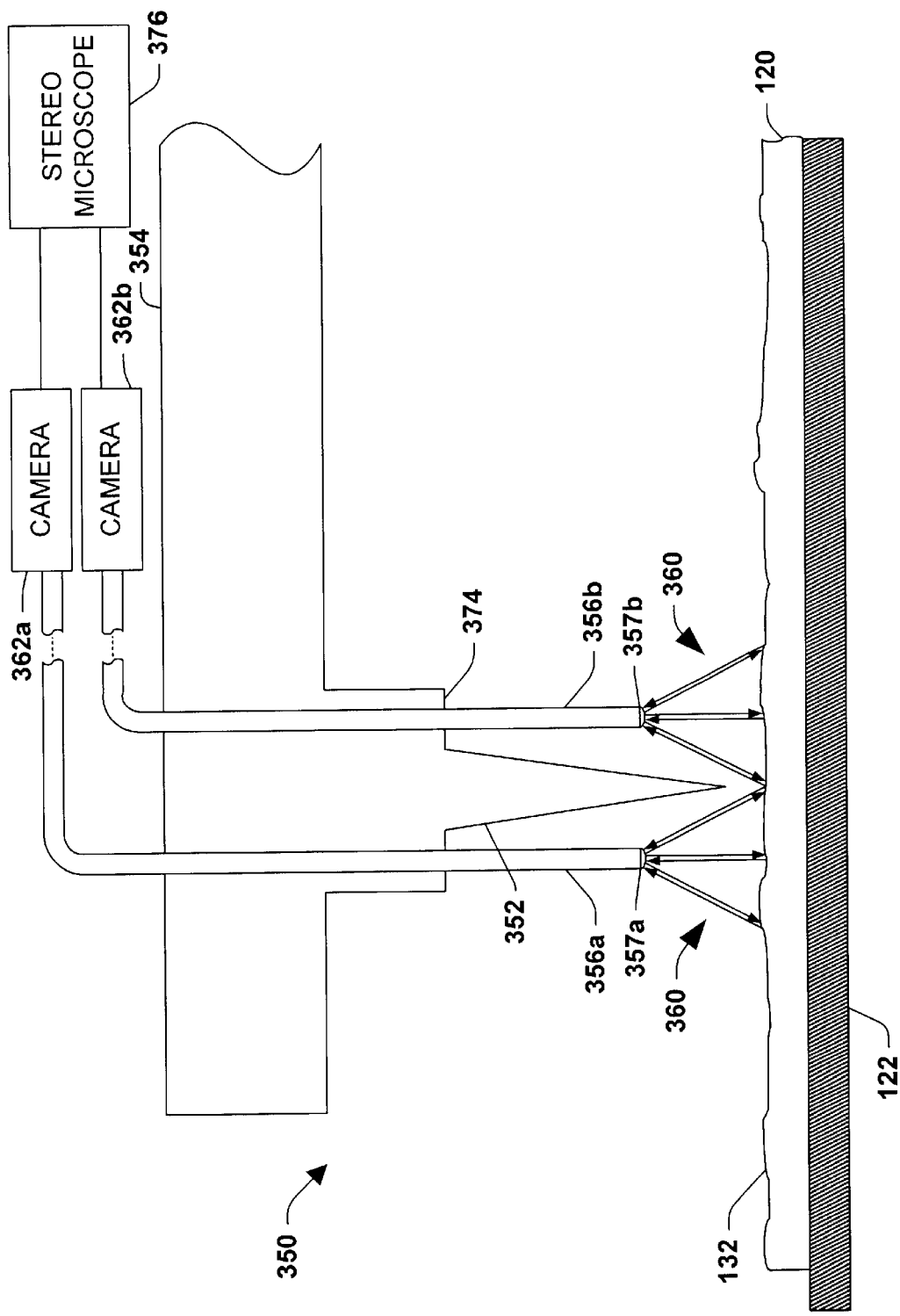
FIG. 12a is an elevation view illustrating another embodiment of a scanning assembly in accordance with the invention.

Referring also to FIG. 12a, the optical fibers 356a and 356b may provide light 360 reflected from the workpiece surface 132 to individual cameras 362a and 362b. In order to provide three dimensional viewing of the topographical features of the surface 132, the cameras 362a and 362b may be connected to a stereo microscope 376. The cameras 362a and 362b, and the stereo microscope 376 allow depth perception by a user. Other forms of optical processors may be provided in order to display visual topography information to a user, including, for example, multicolor displays generating images where different colors indicate different depths, etc. In addition, the fibers 356a and 356b may be provided with lenses 357a and 357b for wide angle viewing of the workpiece surface 132.

Figure 14:
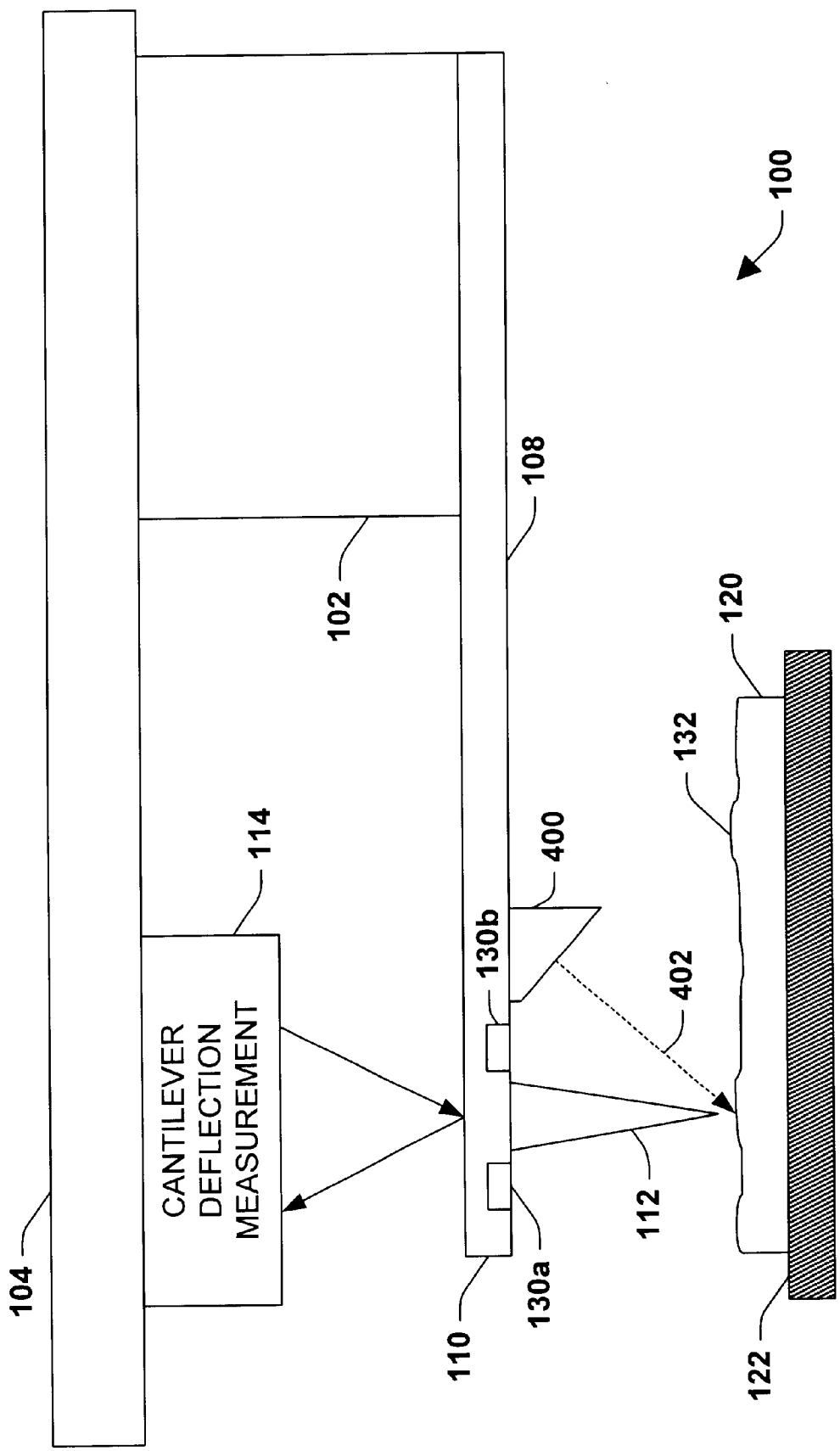
FIG. 14 is an elevation view illustrating another embodiment of a system and apparatus for measuring a feature of a workpiece in accordance with the present invention.

Referring now to FIGS. 13 and 14, another aspect of the present invention contemplates the provision of a light source 400 fabricated on a cantilever 108 of a scanning assembly 100, and adapted to provide light 402 to a feature of a workpiece surface 132 beneath the scanning assembly 100. The light 402 may be provided to the surface 132 in order to facilitate or improve the visual imaging provided by the invention. In this regard, for example, the light 402 provided by the light source 400 in FIG. 14 may be reflected off the surface 132 of a workpiece 120 beneath or near the scanning tip 112, and sensed by one or more optical sensors 130a and 130b. It will also be appreciated that the light source 400 may be provided with a lens (not shown).

Figure 15:
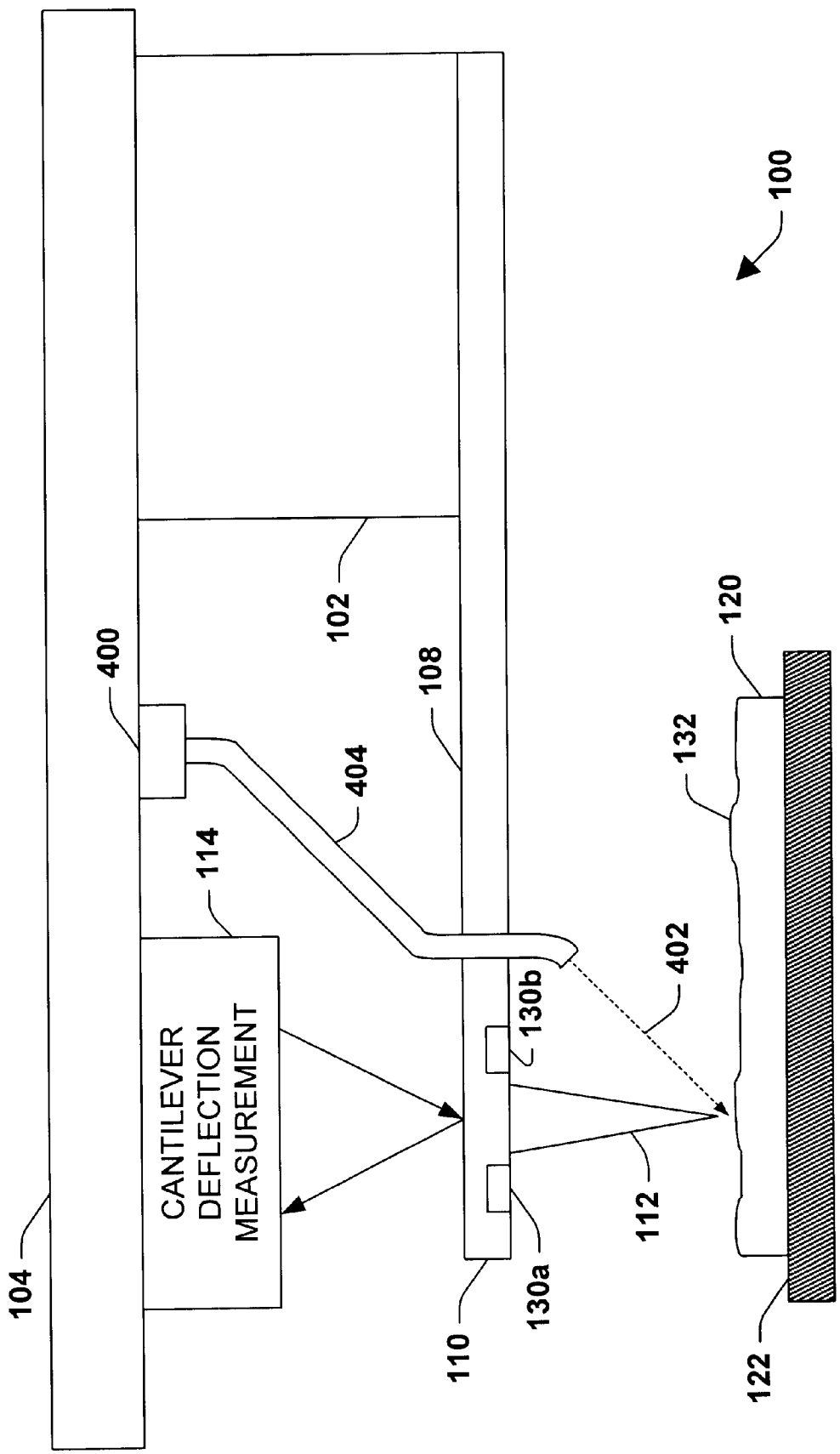
FIG. 15 is an elevation view illustrating another embodiment of a system and apparatus for measuring a feature of a workpiece in accordance with the present invention.

Referring also to FIG. 15, the light source 400 may also comprise an optical fiber 404 fabricated on the cantilever 108 (and/or fabricated on the tip 112) to provide light to the workpiece surface 132. The fiber 404 may be shaped or bent to provide light to a specific portion of the surface 132, such as the area directly below the tip 112. In addition, the optical fiber may further comprise a lens (not shown) in order to provide light to a wide portion of the workpiece surface 132, as discussed with respect to FIGS. 11 and 12a supra.

Figure 16:
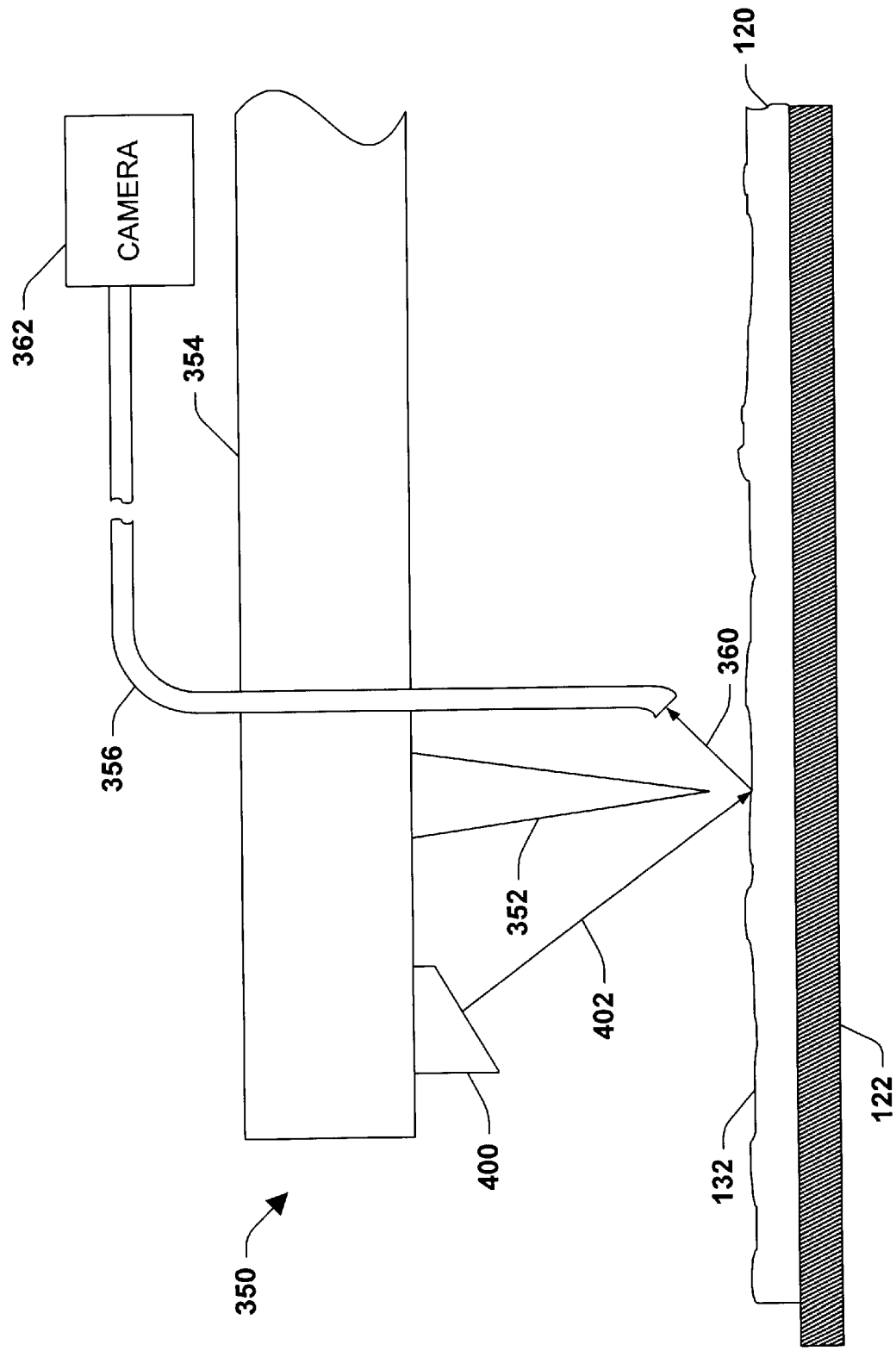
FIG. 16 is an elevation view illustrating another embodiment of a system and apparatus for measuring a feature of a workpiece in accordance with the present invention.

In FIG. 16, another embodiment of the invention is illustrated wherein a light source 400 is fabricated on a cantilever 354 as part of a scanning assembly 350. The light source 400 provides light 402 to the workpiece surface 132 under the tip 352. Reflected light 360 is then received by the optical fiber 356, and transmitted therein to the camera or controller 362 for processing.

Figure 17:
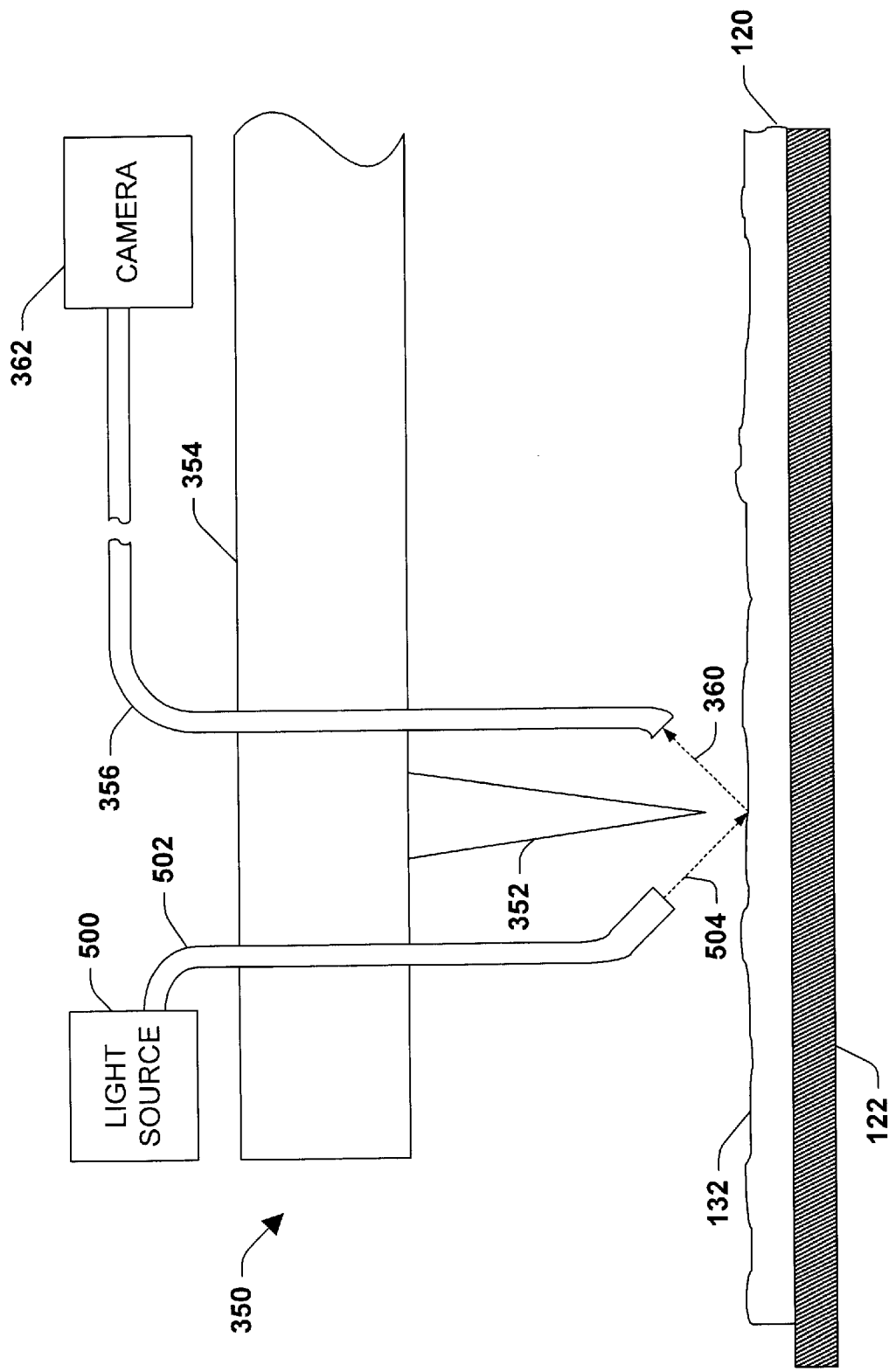
FIG. 17 is an elevation view illustrating another embodiment of a system and apparatus for measuring a feature of a workpiece in accordance with the present invention.

As illustrated in FIG. 17, a light source 500 may comprise an optical fiber 502 to provide light 504 to the surface 132 of the workpiece 120, which is then reflected as light 360 and transmitted via the optical fiber 356 to a camera 362. The fibers 502 and 356 may be positioned and or shaped to form a variety of patterns and/or configurations which effectively provide and receive light with respect to a workpiece surface 132 in order to provide high resolution visual imaging thereof.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A scanning tip assembly for scanning a workpiece having a visual image in a scanning probe microscope, the scanning tip assembly comprising:
   a base;
   a cantilever assembly having a tip and a cantilever, the cantilever having a first portion mounted on the base and a second portion adapted for deflection relative to the base, and the tip being mounted on the second portion of the cantilever; and
   an optical sensor associated with the cantilever assembly and adapted to generate a signal representative of the visual image of at least a portion of the workpiece;
   wherein the at least a portion of the workpiece is directly below the tip.

2. The scanning tip assembly of claim 1, wherein the optical sensor comprises a solid state device.

3. A scanning tip assembly for scanning a workpiece having a visual image in a scanning probe microscope, the scanning tip assembly comprising:
   a base;
   a cantilever assembly having a tip and a cantilever, the cantilever having a first portion mounted on the base and a second portion adapted for deflection relative to the base, and the tip being mounted on the second portion of the cantilever; and
   an optical sensor associated with the cantilever assembly and adapted to generate a signal representative of the visual image of at least a portion of the workpiece;
   wherein the at least a portion of the workpiece is beneath the tip; and
   wherein the optical sensor is fabricated on the cantilever near the tip.

4. The scanning tip assembly of claim 3, wherein the optical sensor comprises a solid state device.

5. A scanning tip assembly for scanning a workpiece having a visual image in a scanning probe microscope, the scanning tip assembly comprising:
   a base;
   a cantilever assembly having a tip and a cantilever, the cantilever having a first portion mounted on the base and a second portion adapted for deflection relative to the base, and the tip being mounted on the second portion of the cantilever; and
   an optical sensor associated with the cantilever assembly and adapted to generate a signal representative of the visual image of at least a portion of the workpiece;
   wherein the at least a portion of the workpiece is beneath the tip;
   wherein the optical sensor is associated with the tip; and
   wherein the optical sensor is fabricated on the tip.

6. The scanning tip assembly of claim 3, wherein the cantilever assembly further comprises electrical connections adapted to connect the optical sensor with an optical processor.

7. The scanning tip assembly of claim 3, further comprising a light source adapted to illuminate at least a portion of the workpiece.

8. The scanning tip assembly of claim 7, wherein the light source is a fiber optic source.

9. The scanning tip assembly of claim 3, wherein the sensor is pivotally mounted on the cantilever assembly.

10. The scanning tip assembly of claim 9, further comprising a piezoelectric material adapted to pivot the sensor relative to the cantilever assembly.

11. The scanning tip assembly of claim 3, wherein the scanning probe microscope is an atomic force microscope or a scanning tunneling microscope.

12. A measuring apparatus comprising:
   a scanning probe microscope having a base, a scanning assembly with a cantilever mounted to the base to provide deflection of the cantilever relative to the base and a tip mounted on the cantilever, and means for measuring the deflection of the cantilever relative to the base;
   means for displacing a workpiece relative to the scanning assembly;
   means for measuring a feature on the workpiece based on the deflection of the cantilever as the workpiece is displaced relative to the scanning assembly;
   an optical sensor associated with the scanning assembly and adapted to generate an output signal representative of a feature on the workpiece near the tip; and
   a display connected to the optical sensor and adapted to generate a visual image based on the output signal;
   wherein the optical sensor is fabricated on the cantilever.

13. The measuring apparatus of claim 12, wherein the optical sensor is integral with the cantilever.

14. The measuring apparatus of claim 12, wherein the optical sensor is fabricated near the tip.

15. A measuring apparatus comprising:
   a scanning probe microscope having a base, a scanning assembly with a cantilever mounted to the base to provide deflection of the cantilever relative to the base and a tip mounted on the cantilever, and means for measuring the deflection of the cantilever relative to the base;
   means for displacing a workpiece relative to the scanning assembly;
   means for measuring a feature on the workpiece based on the deflection of the cantilever as the workpiece is displaced relative to the scanning assembly;
   an optical sensor associated with the scanning assembly and adapted to generate an output signal representative of a feature on the workpiece near the tip; and
   a display connected to the optical sensor and adapted to generate a visual image based on the output signal;
   wherein the optical sensor is fabricated on the tip.

16. The measuring apparatus of claim 15, wherein the optical sensor is integral with the tip.

17. The measuring apparatus of claim 12, wherein the optical sensor is a charge coupled device.

18. The measuring apparatus of claim 12, further comprising a light source adapted to illuminate at least a portion of the workpiece.

19. The measuring apparatus of claim 18, wherein the light source is fabricated on the cantilever.

20. The measuring apparatus of claim 18, wherein the light source is fabricated on the tip.

21. The measuring apparatus of claim 18, wherein the light source is an optical fiber.

22. The measuring apparatus of claim 12, wherein the display comprises a stereo microscope.

23. An atomic force microscope for obtaining a visual image of a workpiece while scanning, the microscope comprising:

a scanning assembly having a cantilever mounted to the base to provide deflection of the cantilever relative to the base and a tip mounted on the cantilever, and means for measuring the deflection of the cantilever relative to the base;

means for displacing a workpiece relative to the scanning assembly;

means for measuring a feature on the workpiece based on the deflection of the cantilever as the workpiece is displaced relative to the scanning assembly;

means for optically scanning at least a portion of the workpiece directly beneath the tip; and means for generating a visual image of the at least a portion of the workpiece.

24. The atomic force microscope of claim 23, wherein the means for optically scanning comprises:

an optical sensor associated with the scanning assembly and adapted to generate an output signal representative of a feature on the workpiece; and a display connected to the optical sensor and adapted to generate a visual image based on the output signal;

wherein the feature is located beneath the tip.

25. An atomic force microscope for obtaining a visual image of a workpiece while scanning, the microscope comprising:

a scanning assembly having a cantilever mounted to the base to provide deflection of the cantilever relative to the base end a tip mounted on the cantilever, and means for measuring the deflection of the cantilever relative to the base;

means for displacing a workpiece relative to the scanning assembly;

means for measuring a feature on the workpiece based on the deflection of the cantilever as the workpiece is displaced relative to the scanning assembly;

means for optically scanning at least a portion of the workpiece beneath the tip; and means for generating a visual image of the at least a portion of the workpiece;

wherein the means for optically scanning comprises:

an optical sensor associated with the scanning assembly and adapted to generate an output signal representative of a feature on the workpiece; and a display connected to the optical sensor and adapted to generate a visual image based on the output signal;

wherein the feature is located beneath the tip; and wherein the optical sensor is fabricated on the cantilever.

26. The atomic force microscope of claim 25, wherein the optical sensor is integral with the cantilever.

27. The atomic force microscope of claim 25, wherein the optical sensor is fabricated near the tip.

28. An atomic force microscope for obtaining a visual image of a workpiece while scanning, the microscope comprising:

a scanning assembly having a cantilever mounted to the base to provide deflection of the cantilever relative to the base and a tip mounted on the cantilever, and means for measuring the deflection of the cantilever relative to the base;

means for displacing a workpiece relative to the scanning assembly;

means for measuring a feature on the workpiece based on the deflection of the cantilever as the workpiece is displaced relative to the scanning assembly;

means for optically scanning at least a portion of the workpiece beneath the tip; and means for generating a visual image of the at least a portion of the workpiece;

wherein the means for optically scanning comprises:

an optical sensor associated with the scanning assembly and adapted to generate an output signal representative of a feature on the workpiece; and a display connected to the optical sensor and adapted to generate a visual image based on the output signal;

wherein the feature is located beneath the tip; and wherein the optical sensor is fabricated on the tip.

29. The atomic force microscope of claim 28, wherein the optical sensor is integral with the tip.

30. The atomic force microscope of claim 25, wherein the optical sensor is a charge coupled device.

31. The atomic force microscope of claim 25, further comprising a light source.

32. The atomic force microscope of claim 25, further comprising at least two optical sensors, wherein the display comprises a stereo microscope.

* * * * *

UNITED STATES PATENT AND TRADEMARK OFFICE
CERTIFICATE OF CORRECTION

PATENT NO.     : 6,479,817 B1
DATED          : November 12, 2002
INVENTOR(S)    : Sanjay K. Yedur et al.

It is certified that error appears in the above-identified patent and that said Letters Patent is hereby corrected as shown below:

Column 11,
Lines 35-36, please replace claim 2 with the following:

2.  The scanning tip assembly of claim 4, wherein the solid state device is a charge coupled device.

Column 13,
Line 43, please replace the word "end" with the word -- and --.

Signed and Sealed this

First Day of April, 2003

JAMES E. ROGAN
*Director of the United States Patent and Trademark Office*